(12) United States Patent
Takamatsu et al.

(10) Patent No.: US 11,295,143 B2
(45) Date of Patent: Apr. 5, 2022

(54) INFORMATION PROCESSING APPARATUS, INFORMATION PROCESSING METHOD, AND PROGRAM

(71) Applicant: Sony Corporation, Tokyo (JP)

(72) Inventors: Shingo Takamatsu, Tokyo (JP); Kenta Kawamoto, Tokyo (JP); Naoki Ide, Tokyo (JP); Yoshiyuki Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/140,150

(22) Filed: Jan. 4, 2021

(65) Prior Publication Data

US 2021/0124956 A1    Apr. 29, 2021

Related U.S. Application Data

(63) Continuation of application No. 15/579,365, filed as application No. PCT/JP2016/064835 on May 19, 2016, now Pat. No. 10,891,495.

(30) Foreign Application Priority Data

Aug. 19, 2015  (JP) .................................. 2015-161791

(51) Int. Cl.
*B60R 21/00* (2006.01)
*G06K 9/00* (2022.01)
(Continued)

(52) U.S. Cl.
CPC .......... *G06K 9/00791* (2013.01); *B60R 21/00* (2013.01); *B60W 30/09* (2013.01);
(Continued)

(58) Field of Classification Search
CPC ...... G06K 9/00791; G06T 7/85; B60R 21/00; B60W 30/09
(Continued)

(56) References Cited

U.S. PATENT DOCUMENTS 6,100,792 A    8/2000 Ogino et al.
6,292,725 B1   9/2001 Kageyama et al.
(Continued)

FOREIGN PATENT DOCUMENTS

CN    101101702 A    1/2008
CN    101632109 A    1/2010
(Continued)

OTHER PUBLICATIONS

Communication pursuant Article 94(3) EPC, dated Mar. 12, 2020, issued in corresponding European Patent Application No. 16 836 839. 7.
(Continued)

*Primary Examiner* — Nguyen T Truong
(74) *Attorney, Agent, or Firm* — Xsensus LLP

(57) ABSTRACT

The object is to provide an information processing apparatus, an information processing method, and a program capable of appropriately handling a difference between detection results of sensors. The solution is an information processing apparatus including: a detection section configured to detect first information regarding a mobile object; an acquisition section configured to acquire second information regarding the mobile object, the second information being detected by an external apparatus; and a control section configured to control processing based on a comparison result of the first information and the second information detected for the same mobile object.

17 Claims, 12 Drawing Sheets

(51) Int. Cl.
    *G08G 1/09*     (2006.01)
    *G08G 1/16*     (2006.01)
    *G08G 1/0967*     (2006.01)
    *G08G 1/01*     (2006.01)
    *G06T 7/80*     (2017.01)
    *B60W 30/09*     (2012.01)
    *G05D 1/00*     (2006.01)

(52) U.S. Cl.
    CPC ............ *G05D 1/0061* (2013.01); *G06T 7/85* (2017.01); *G08G 1/0104* (2013.01); *G08G 1/09* (2013.01); *G08G 1/096725* (2013.01); *G08G 1/163* (2013.01); *G08G 1/166* (2013.01); *B60W 2556/65* (2020.02)

(58) Field of Classification Search
    USPC .......................................................... 348/148
    See application file for complete search history.

(56) References Cited

U.S. PATENT DOCUMENTS

| | | |
|---|---|---|
| 10,166,994 B1 | 1/2019 | Fields et al. |
| 2003/0216880 A1 | 11/2003 | Endoh |
| 2009/0254245 A1 | 10/2009 | Bauerle |
| 2013/0135517 A1 | 5/2013 | Lee |
| 2015/0161830 A1 | 6/2015 | Lenhardt et al. |
| 2015/0175162 A1 | 6/2015 | Nakadori |
| 2016/0003621 A1 | 1/2016 | Koenig et al. |
| 2017/0023945 A1 | 1/2017 | Cavalcanti et al. |
| 2017/0046958 A1 | 2/2017 | Naka et al. |

FOREIGN PATENT DOCUMENTS

| | | |
|---|---|---|
| CN | 101966846 A | 2/2011 |
| CN | 103996312 A | 8/2014 |
| CN | 104271399 A | 1/2015 |
| CN | 104508729 A | 4/2015 |
| CN | 104816697 A | 8/2015 |
| EP | 1525440 A1 | 4/2005 |
| JP | 2000-339599 A | 12/2000 |
| JP | 2001301485 A | 10/2001 |
| JP | 2003-331390 A | 11/2003 |
| JP | 2005-50187 A | 2/2005 |
| JP | 2006315427 A | 11/2006 |
| JP | 2008225786 A | 9/2008 |
| JP | 2008-299676 A | 12/2008 |
| JP | 2012-035795 A | 2/2012 |
| JP | 2013-200820 A | 10/2013 |
| JP | 2014-71839 A | 4/2014 |
| KR | 10-2013-0046818 A | 5/2013 |
| WO | 2012/020293 A2 | 2/2012 |

OTHER PUBLICATIONS

Japanese Office Action dated Mar. 17, 2020, issued in corresponding Japanese Patent Application No. 2017-535260.
European Search Report dated Apr. 12, 2019, in corresponding European Application No. 16836839.7, 11 pages.
International Search Report dated Aug. 2, 2016 in PCT/JP2016/064835 filed May 19, 2016.

INFORMATION PROCESSING APPARATUS, INFORMATION PROCESSING METHOD, AND PROGRAM

CROSS REFERENCE TO RELATED APPLICATIONS

This application is a continuation of U.S. application Ser. No. 15/579,365, filed Dec. 4, 2017, which is based on PCT filing PCT/JP2016/064835, filed May 19, 2016, which claims priority to JP 2015-161791, filed Aug. 19, 2015, the entire contents of each are incorporated herein by its reference.

TECHNICAL FIELD

The present disclosure relates to an information processing apparatus, an information processing method, and a program.

BACKGROUND ART

In recent years, a traffic system that uses a sensor such as an onboard sensor or a surveillance camera on a road to promote the safety of a vehicle has attracted attention. In such a traffic system, information detected by a plurality of sensors is integrated, thereby extracting useful information. Notifying a driver of the information, treating the information as input information for automated driving, or the like is a use of the information.

As an example of such technology, for example, Patent Literature 1 below discloses a technique of recognizing the relative positional relationship between an own vehicle and a different vehicle on the basis of position information and speed information detected in the own vehicle and the different vehicle.

In addition, Patent Literature 2 below discloses a technique of notifying a driver of information regarding a different vehicle and a pedestrian that lurk at a position serving as a blind spot as viewed from an own vehicle on the basis of an image taken by a camera installed in an environment.

CITATION LIST

Patent Literature

Patent Literature 1: JP 2014-71839A
Patent Literature 2: JP 2013-200820A

DISCLOSURE OF INVENTION

Technical Problem

The above-described technique proposed in Patent Literature 1, 2, or the like has not been developed for a long time, so that it is difficult to declare that a technique for using sensors in a variety of situations is sufficiently proposed. For example, a technique for appropriately handling a difference in detection results between sensors is also a technique that has not been sufficiently proposed.

The present disclosure then proposes a novel and improved information processing apparatus, information processing method, and program capable of appropriately handling a difference between detection results of sensors.

Solution to Problem

According to the present disclosure, there is provided an information processing apparatus including: a detection section configured to detect first information regarding a mobile object; an acquisition section configured to acquire second information regarding the mobile object, the second information being detected by an external apparatus; and a control section configured to control processing based on a comparison result of the first information and the second information detected for the same mobile object.

In addition, according to the present disclosure, there is provided an information processing method including: detecting first information regarding a mobile object; acquiring second information regarding the mobile object, the second information being detected by an external apparatus; and controlling, by a processor, processing based on a comparison result of the first information and the second information detected for the same mobile object.

In addition, according to the present disclosure, there is provided a program for causing a computer to function as: a detection section configured to detect first information regarding a mobile object; an acquisition section configured to acquire second information regarding the mobile object, the second information being detected by an external apparatus; and a control section configured to control processing based on a comparison result of the first information and the second information detected for the same mobile object.

Advantageous Effects of Invention

As described above, according to the present disclosure, it is possible to appropriately handle a difference in detection results between sensors. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
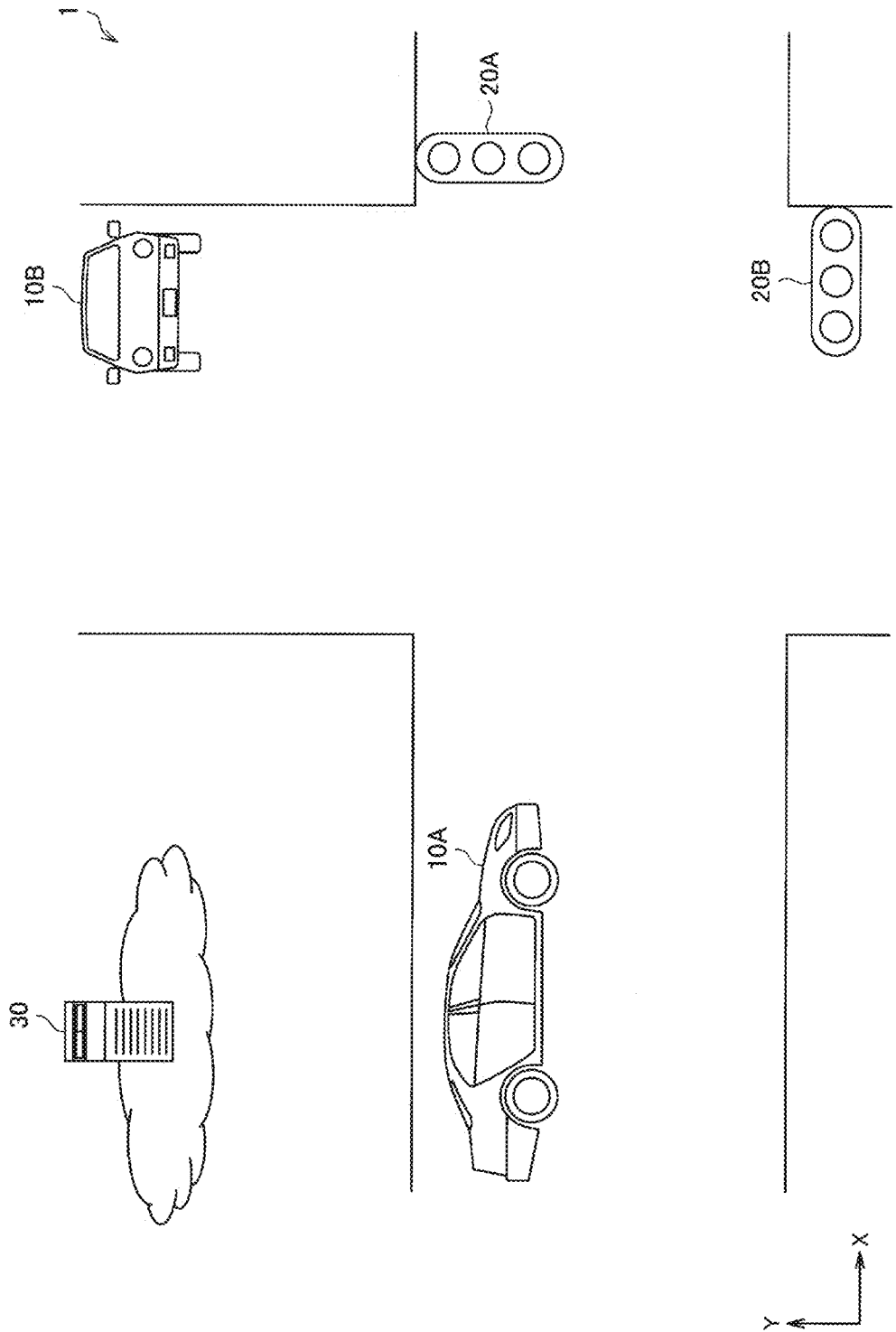
FIG. 1 is an explanatory diagram for describing an overview of a system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be now made in the following order.
1. Introduction
1.1. Overview
1.2. Technical Problem
2. First Embodiment
2.1. Configuration Example of Onboard Sensor Apparatus
2.2. Configuration Example of Environment Installation Sensor Apparatus
2.3. Technical Features
2.4. Flow of Processing
3. Hardware Configuration Example
4. Conclusion

1. Introduction

<1.1. Overview>

First, the overview of a system 1 according to an embodiment of the present disclosure will be described with reference to FIG. 1.

FIG. 1 is an explanatory diagram for describing the overview of the system 1 according to the present embodiment. FIG. 1 illustrates the situation in which a vehicle 10A and a vehicle 10B are respectively traveling in an X direction and a −Y direction, and entering an intersection. For example, it is not possible in some cases for a driver of the vehicle 10A to visually recognize the vehicle 10B. Accordingly, it is desirable to provide information of the vehicle 10B. The same applies to a driver of the vehicle 10B.

Therefore, the respective sensor apparatuses included in the system 1 share information detected by built-in or connected sensors with each other. This allows the system 1 to provide a variety of services. For example, the system 1 notifies a driver of danger that the driver himself or herself does not recognize, and provides information for automated driving of a vehicle to each vehicle.

Sensor apparatuses can be mounted, for example, on mobile objects such as the vehicles 10A and 10B. In addition, sensor apparatuses can be mounted, for example, on infrastructures such as traffic lights 20A and 20B. For example, a sensor apparatus (onboard sensor apparatus 100 described with reference to FIG. 2) mounted on the vehicle 10A and a sensor apparatus (environment installation sensor apparatus 200 described with reference to FIG. 3) mounted on the traffic light 20A perform sensing regarding the vehicle 10A or a driver of the vehicle 10A. Similarly, a sensor apparatus mounted on the vehicle 10B and a sensor apparatus mounted on the traffic light 20B perform sensing regarding the driver of the vehicle 10B or the vehicle 10B. The sensor information obtained regarding the vehicle 10A or a driver of the vehicle 10A, and the sensor information obtained regarding the vehicle 10B or a driver of the vehicle 10B are then shared between these sensor apparatuses. This allows each sensor apparatus to perform processing based on the shared sensor information. For example, the sensor apparatus mounted on the vehicle 10A performs processing for avoiding a collision with the vehicle 10B on the basis of the sensor information obtained regarding the vehicle 10B or a driver of the vehicle 10B.

Information may be directly shared, for example, between the sensor apparatuses. Additionally, for example, a server 30 on cloud computing may share information and/or perform processing based on the shared information. If it is into consideration that a geographical area in which information is shared can be limited, implementing the server 30 as a mobile edge computing (MEC) server provided to a base station of mobile communication is effective in decreasing the latency of a service.

<1.2. Technical Problem>

In the above-described system 1, sensors are mounted on a variety of apparatuses including mobile objects such as vehicles and facilities such as traffic lights. A service provided by the system 1 is based on information detected by these sensors. Therefore, the quality of the service depends on whether the sensors are normal or abnormal.

Abnormalities of sensors can be caused by a variety of factors. Examples of the factors include influence of the weather such as fog or rain, the sensor installation angle changed by rough driving, and the like. If it is taken into consideration that a vast number of sensors can be mounted, it is desirable that abnormalities of the sensors be autonomously discovered and the sensors be automatically corrected to be normal.

In view of such circumstances, the system 1 according to an embodiment of the present disclosure has been devised. In the system 1 according to the present embodiment, abnormalities of the sensors are autonomously discovered, and processing corresponding to the abnormalities of the sensors is performed.

2. First Embodiment

First, with reference to FIGS. 2 and 3, a configuration example of each apparatus will be described.

<2.1. Configuration Example of Onboard Sensor Apparatus>

Figure 2:
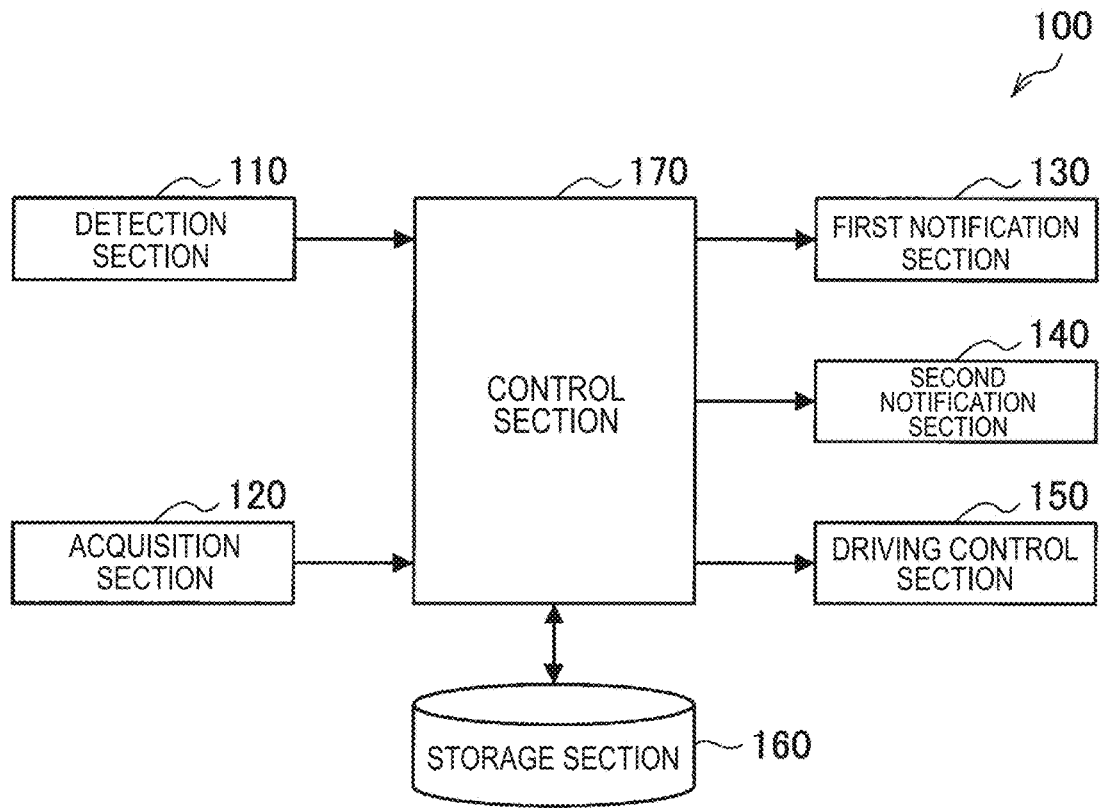
FIG. 2 is a block diagram illustrating an example of a logical configuration of an onboard sensor apparatus according to a first embodiment.

FIG. 2 is a block diagram illustrating an example of a logical configuration of an onboard sensor apparatus 100 according to the present embodiment. As illustrated in FIG. 2, the onboard sensor apparatus 100 includes a detection section 110, an acquisition section 120, a first notification section 130, a second notification section 140, a driving control section 150, a storage section 160, and a control section 170.

(1) Detection Section 110

The detection section 110 detects (senses) various kinds of information.

For example, the detection section 110 detects information regarding a mobile object. This mobile object may be a mobile object itself on which the onboard sensor apparatus 100 is mounted, or a mobile object other than that. The detected information can include, for example, the position, speed, acceleration, and/or size of the mobile object. The detection section 110 may include a stereo-camera, a laser range sensor, a millimeter-wave radar, or the like. In addition, the detection section 110 may include a gyro sensor, an acceleration sensor, or the like. In addition, the detection sections 110 may be disposed at the respective parts of the vehicle, and may include a variety of sensors for detecting the rotation speed of the engine, the torque, the operations state of the vehicle, or the like. It is assumed that the detection section 110 includes a recognition module for recognizing speed and the like from raw data obtained from these sensors.

The information detected by the detection section 110 will also be referred as first sensor information (first information) below.

(2) Acquisition Section 120

The acquisition section 120 has a function of acquiring information regarding a mobile object that is detected by an external apparatus. For example, the acquisition section 120 acquires information (first sensor information) detected by another sensor apparatus (another onboard sensor apparatus 100 or environment installation sensor apparatus 200). For example, the acquisition section 120 can be implemented by a communication apparatus.

The information acquired by the acquisition section 120 will also be referred to as second sensor information (second information) below. Note that, the second sensor information is first sensor information for the other sensor apparatus that is the acquisition source. In the case where there is no need to distinguish first sensor information from second information in particular, they will be generically referred to as sensor information.

(3) First Notification Section 130

The first notification section 130 has a function of notifying a driver (user) of a vehicle on which the onboard sensor apparatus 100 is mounted of various kinds of information. For example, the first notification section 130 can be implemented by a display apparatus, a sound output apparatus, an actuator that generates vibration or the like, or the like.

(4) Second Notification Section 140

The second notification section 140 has a function of notifying an apparatus other than a vehicle on which the onboard sensor apparatus 100 is mounted of various kinds of information. For example, the second notification section 140 can be implemented by a communication apparatus. Additionally, the second notification section 140 may be implemented by a display apparatus. In that case, the receiving side can recognize information of which the receiving side is notified, for example, by performing image recognition or the like on displayed information.

(5) Driving Control Section 150

The driving control section 150 has a function of automatically driving a vehicle on which the onboard sensor apparatus 100 is mounted. For example, the driving control section 150 grasps the condition of a vehicle on which the onboard sensor apparatus 100 is mounted, another vehicle, and the condition of the road surface on the basis of first sensor information or second sensor information, and performs steering control, accelerator control, brake control, and the like. The control section 170 switches on/off the automated driving function by the driving control section 150.

(6) Storage Section 160

The storage section 160 temporarily or permanently stores programs and various kinds of data for the operation of the onboard sensor apparatus 100.

(7) Control Section 170

The control section 170 functions as an operation processing apparatus and a control apparatus, and controls the overall operation of the onboard sensor apparatus 100 in accordance with a variety of programs. The control section 170 provides various functions of the onboard sensor apparatus 100. The functions provided by the control section 170 will be described in detail below.

<2.2. Configuration Example of Environment Installation Sensor Apparatus>

Figure 3:
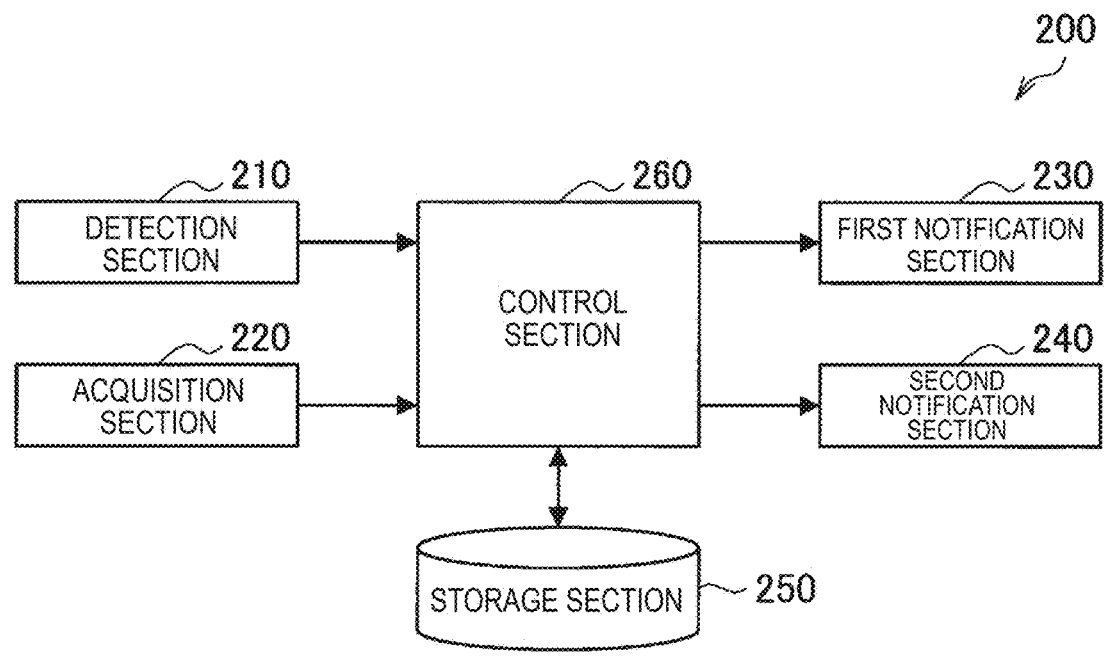
FIG. 3 is a block diagram illustrating an example of a logical configuration of an environment installation sensor apparatus according to the embodiment.

FIG. 3 is a block diagram illustrating an example of a logical configuration of the environment installation sensor apparatus 200 according to the present embodiment. As illustrated in FIG. 3, the environment installation sensor apparatus 200 includes a detection section 210, an acquisition section 220, a first notification section 230, a second notification section 240, an storage section 250, and a control section 260. The functions of these components are similar to the functions of the detection section 110, the acquisition section 120, the first notification section 130, the second notification section 140, the storage section 160, and the control section 170 included in the onboard sensor apparatus 100. That is, the environment installation sensor apparatus 200 includes similar functional components to the functional components of the onboard sensor apparatus 100 except for the driving control section 150.

The configuration example of each apparatus has been described above.

<2.3. Technical Features>

Next, with reference to FIGS. 4 to 7, technical features of the onboard sensor apparatus 10 according to the present embodiment will be described. The following describes technical features, focusing on one onboard sensor apparatus 100. A vehicle on which the onboard sensor apparatus 100 in focus is mounted is also referred to as own vehicle, and another vehicle is also referred to as different vehicle. The onboard sensor apparatus 100 that is mounted on a different vehicle is also referred to as another onboard sensor apparatus 100. In addition, a sensor apparatus (another onboard sensor apparatus 100 or environment installation sensor apparatus 200) other than the onboard sensor apparatus 100 is also referred to as another sensor apparatus.

(1) Sharing of Information

Each sensor apparatus shares information. For example, the onboard sensor apparatus 100 (e.g., second notification section 140) transmits first sensor information to another sensor apparatus. In addition, the onboard sensor apparatus 100 (e.g., acquisition section 120) acquires second sensor information from another sensor apparatus.

The onboard sensor apparatus 100 (e.g., control section 170) may share sensor information with another sensor apparatus present within a predetermined distance from an own vehicle. The presence within a predetermined distance can be determined on the basis of a transmission and reception result of a near field wireless communication signal such as Bluetooth (registered trademark) or position information of the other sensor apparatus which is registered in advance. Each sensor apparatus may transmit and receive its position information via the server 30.

The onboard sensor apparatus 100 may preferentially acquire second sensor information from another sensor apparatus capable of detecting the area that overlaps with the area which the onboard sensor apparatus 100 is capable of detecting. In that case, the onboard sensor apparatus 100 is capable of knowing multifaceted sensor information regarding the same area.

The onboard sensor apparatus 100 may preferentially acquire second sensor information from another sensor apparatus capable of detecting the area (i.e., blind spot) that does not overlap with the area which the onboard sensor apparatus 100 is capable of detecting. More simply, the onboard sensor apparatus 100 may preferentially acquire second sensor information from another sensor apparatus present in a blind spot. Here, the blind spot refers an area in which it is not possible for a sensor of the onboard sensor apparatus 100 to detect sensor information because of an obstacle and the like between an own vehicle and the blind spot. The onboard sensor apparatus 100 is capable of knowing sensor information of a wider area by acquiring sensor information related to the blind spot.

The onboard sensor apparatus 100 (e.g., acquisition section 120) may preferentially acquire second sensor information from another sensor apparatus that is in the vicinity of an own vehicle or predicted to be in the vicinity of an own vehicle in the future. In that case, the onboard sensor apparatus 100 is capable of efficiently knowing sensor information related to the future of the own vehicle.

The onboard sensor apparatus 100 (e.g., acquisition section 120) may preferentially acquire second sensor information from another sensor apparatus capable of more accurately detecting sensor information than itself (i.e., detection section 110). In that case, the onboard sensor apparatus 100 is capable of efficiently knowing more accurate sensor information.

The above-described standards with respect to from which of other sensor apparatuses second sensor information is preferentially acquired may be given any ranks or combined as appropriate.

(2) Sensor Information to be Shared

It is possible to conceive of various kinds of sensor information to be shared.

For example, sensor information can include information regarding a mobile object. The sensor information can include, for example, at least one of the position, size, type, speed, acceleration, moving direction, detection accuracy, and detection time of the mobile object. The sensor information can include the above-described information of each of a plurality of mobile objects. Here, the mobile object may be an own vehicle, a different vehicle, or any mobile object such as a pedestrian.

In addition, the sensor information can include biological information of a driver. The biological information can include at least one of a heart rate, body temperature, perspiration, blood pressure, perspiration, a pulse, respiration, nictation, eye movement, gaze time, pupil diameter size, blood pressure, brain waves, body movement, a body position, skin temperature, skin electric resistance, microvibration (MV), myoelectric potential, and blood oxygen saturation (SPO2). The biological information may include these kinds of information themselves, or information showing the degree of tension or the like that is recognized, for example, on the basis of body temperature, perspiration, and the like.

In addition, the sensor information can include the degree of reliability. The degree of reliability is information showing the certainty of sensor information. For example, the degree of reliability has a high value in the case where the performance of a sensor is favorable, information remains consistent for a period longer than or equal to a predetermined period, sensor information is detected by a plurality of sensors, sensor information is detected while an own vehicle is traveling at speed slower than or equal to predetermined speed, or the like.

In addition, the sensor information can include attribute information of a sensor apparatus that detects the sensor information or an apparatus on which the sensor apparatus is mounted or information showing the internal condition. The sensor information can include, for example, at least one of information showing an onboard type or an environment installation type, information showing a position and an attitude at which a sensor apparatus is provided, and identification information of a sensor included in the sensor apparatus.

(3) Processing Based on Shared Information

The onboard sensor apparatus 100 can perform various kinds of processing on the basis of shared information.

(3-1) Processing Based on Comparison Result

The onboard sensor apparatus 100 (e.g., control section 170) may control processing based on a comparison result of first sensor information and second information detected for the same mobile object.

(Abnormality Determination)

For example, the onboard sensor apparatus 100 (e.g., control section 170) determines an abnormality of the detection section 110 on the basis of a comparison result. The detection section 110 can include a plurality of sensors. The onboard sensor apparatus 100 may determine an abnormality of each of the plurality of these sensors. An abnormality of the detection section 110 will also be referred to as sensor abnormality below.

In the case where an erroneous difference between the first sensor information and the second sensor information satisfies a predetermined condition, the onboard sensor apparatus 100 determines a sensor abnormality. For example, in the case where an erroneous difference between first sensor information and second information regarding the same mobile object is greater than a threshold, the onboard sensor apparatus 100 determines a sensor abnormality. In the case where the erroneous difference is less than or equal to the threshold, the onboard sensor apparatus 100 determines that the sensor is normal. This point will be described in detail with reference to FIGS. 4 and 5.

Figure 4:
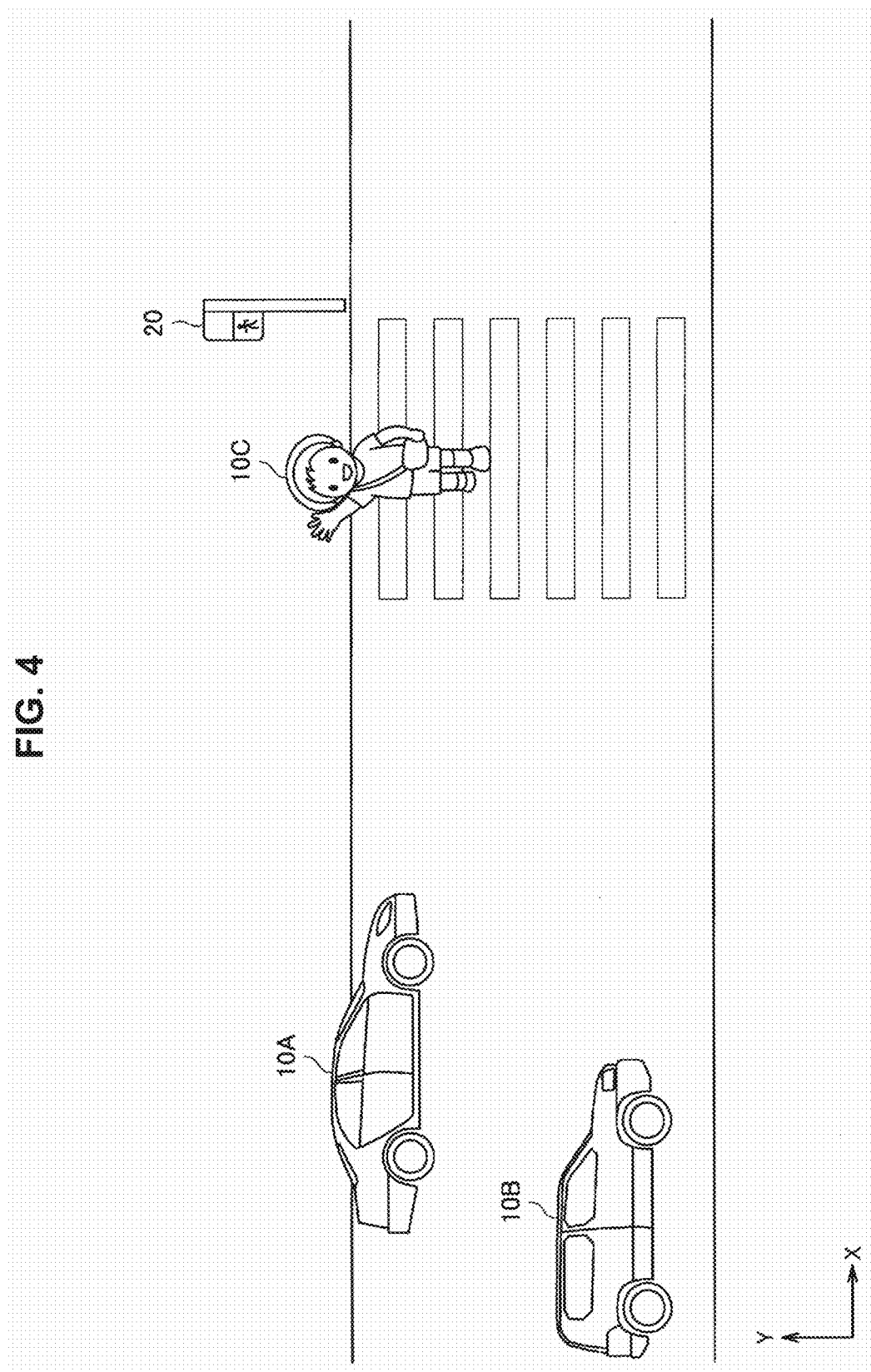
FIG. 4 is an explanatory diagram for describing sensor abnormality determination processing according to the embodiment.
Figure 5:
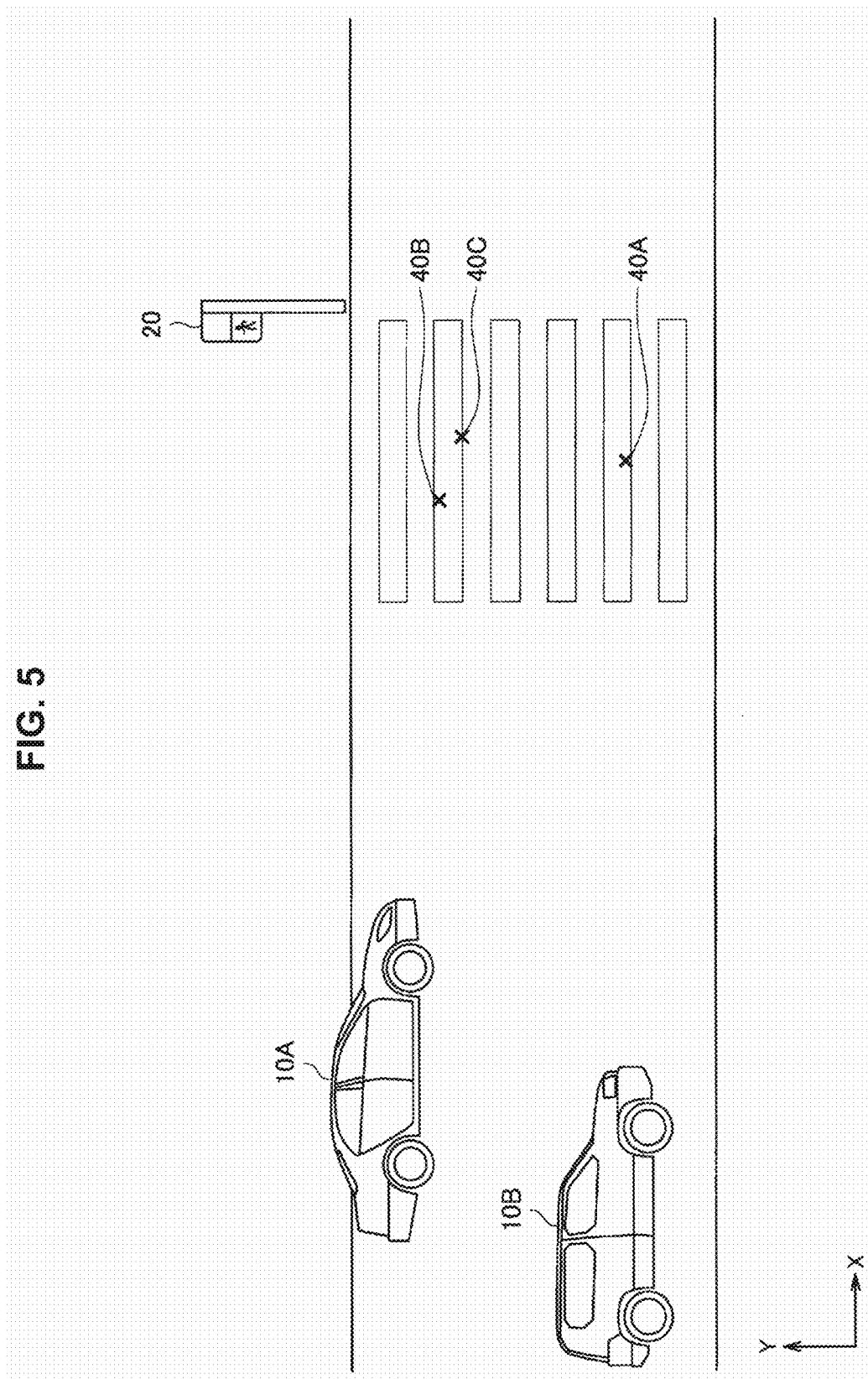
FIG. 5 is an explanatory diagram for describing the sensor abnormality determination processing according to the embodiment.

FIGS. 4 and 5 are explanatory diagrams each of which describes sensor abnormality determination processing according to the present embodiment. FIG. 4 illustrates a situation in which the vehicles 10A and 10B are traveling in an X direction and arriving at a crosswalk provided with the traffic light 20. A person 10C is walking on the crosswalk. In such a situation, for example, sensor apparatuses (onboard sensor apparatuses 100 or environment installation sensor apparatuses 200) mounted on the vehicles 10A and 10B and the traffic light 20 share sensor information regarding the person 10C that is a mobile object. A sharing result of the sensor information is illustrated in FIG. 5. Coordinates 40A represent the position of the person 10C detected by an onboard sensor apparatus 100A mounted on the vehicle 10A. Coordinates 40B represent the position of the person 10C detected by an onboard sensor apparatus 100B mounted on the vehicle 10B. Coordinates 40C represent the position of the person OC detected by the environment installation sensor apparatus 200 mounted on the traffic light 20. For example, since the coordinates 40A are apart from the coordinates 40B and 40C, the onboard sensor apparatus 100A can determine that its sensor is abnormal.

It can be determined by a variety of methods whether the targets of the respective pieces of sensor information are the same mobile object or not. For example, in the case where the coordinates of mobile objects targeted by the respective pieces of sensor information fall within a predetermined distance, it can be determined that the mobile targets are the same. In addition, in the case where the same identification information is recognized from mobile objects targeted by the respective pieces of sensor information, it can be determined that the mobile objects are the same. The identification information may be an identification ID sent from the vehicle or the sensor apparatus, an automobile registration number obtained by performing image recognition on the license plate, or the like.

The onboard sensor apparatus 100 may use only sensor information having the degree of reliability greater than or equal to a predetermined value as a comparison target. This prevents a sensor abnormality from being determined by accident on the basis of a comparison with an abnormal value.

In addition, the onboard sensor apparatus 100 may perform comparison processing with first sensor information between a plurality of respective pieces of second sensor information. In that case, the onboard sensor apparatus 100 may determine the conclusive presence or absence of a sensor abnormality on the basis of the proportion in which sensor abnormalities are determined, or sets the degree of certainty about a determination result of a sensor abnormality.

The onboard sensor apparatus 100 may selects second sensor information that is a comparison target by any standard. For example, the onboard sensor apparatus 100 may preferentially select second sensor information acquired from another onboard sensor apparatus 100 mounted on a different vehicle facing an own vehicle. In that case, it is possible to a large amount of second sensor information that is a comparison target in a short time. In addition, the onboard sensor apparatus 100 may preferentially select second sensor information acquired from another onboard sensor apparatus 100 mounted on a different vehicle that travels ahead of or behind an own vehicle or travels side by side with an own vehicle. In that case, it is possible to acquire second sensor information having a large amount of data communication or perform comparison processing that takes time. In addition, the onboard sensor apparatus 100 may preferentially select second sensor information acquired from another onboard sensor apparatus 100 mounted on a parked different vehicle or the environment installation sensor apparatus 200 mounted on an infrastructure. In that case, it is possible to collect second sensor information that is more stable (i.e., has a high degree of reliability).

The following describes a specific example of sensor abnormality determination processing.

For example, it is assumed that n pairs of first sensor information and second sensor information having degrees of reliability higher than or equal to a threshold are acquired within a predetermined time. In that case, the onboard sensor apparatus 100 calculates an evaluation value with an equation (1) below, and determines a sensor abnormality in the case where the evaluation value is greater than a threshold.

[Math. 1]
$$\text{score} = \sum_{i=1}^{n} I(s_i > c)/n \qquad (1)$$

Here, $s_i$ represents a difference value related to a pair i. For example, the difference value is the Euclidean distance between the first sensor information and the second sensor information in the case where the sensor information is expressed as a numeric vector. $I(s_i > c)$ respectively has a value of 1 and a value of 0 in the case where $s_i$ is greater than c and in the case where $s_i$ is less than or equal to c. c represents a threshold, and is set in advance.

In addition, instead of the equation (1) above, an equation (2) below may be used that is weighted by the degree of reliability.

[Math. 2]
$$\text{score} = \sum_{i=1}^{n} r_i I(s_i > c) \bigg/ \sum_{j=1}^{n} r_j \qquad (2)$$

Here, $r_i$ represents the product of the degrees of reliability of i-th paired pieces of sensor information.

The above describes a specific example of sensor abnormality determination processing.

Note that the above describes that the onboard sensor apparatus 100 determines an abnormality of its own sensor with the relationship between first sensor information and second sensor information that is detected by another sensor apparatus. The onboard sensor apparatus 100 may also determine an abnormality of a sensor by a similar method with the relationship between pieces of sensor information detected by a plurality of sensors included in the onboard sensor apparatus 100.

(Warning)

Figure 6:
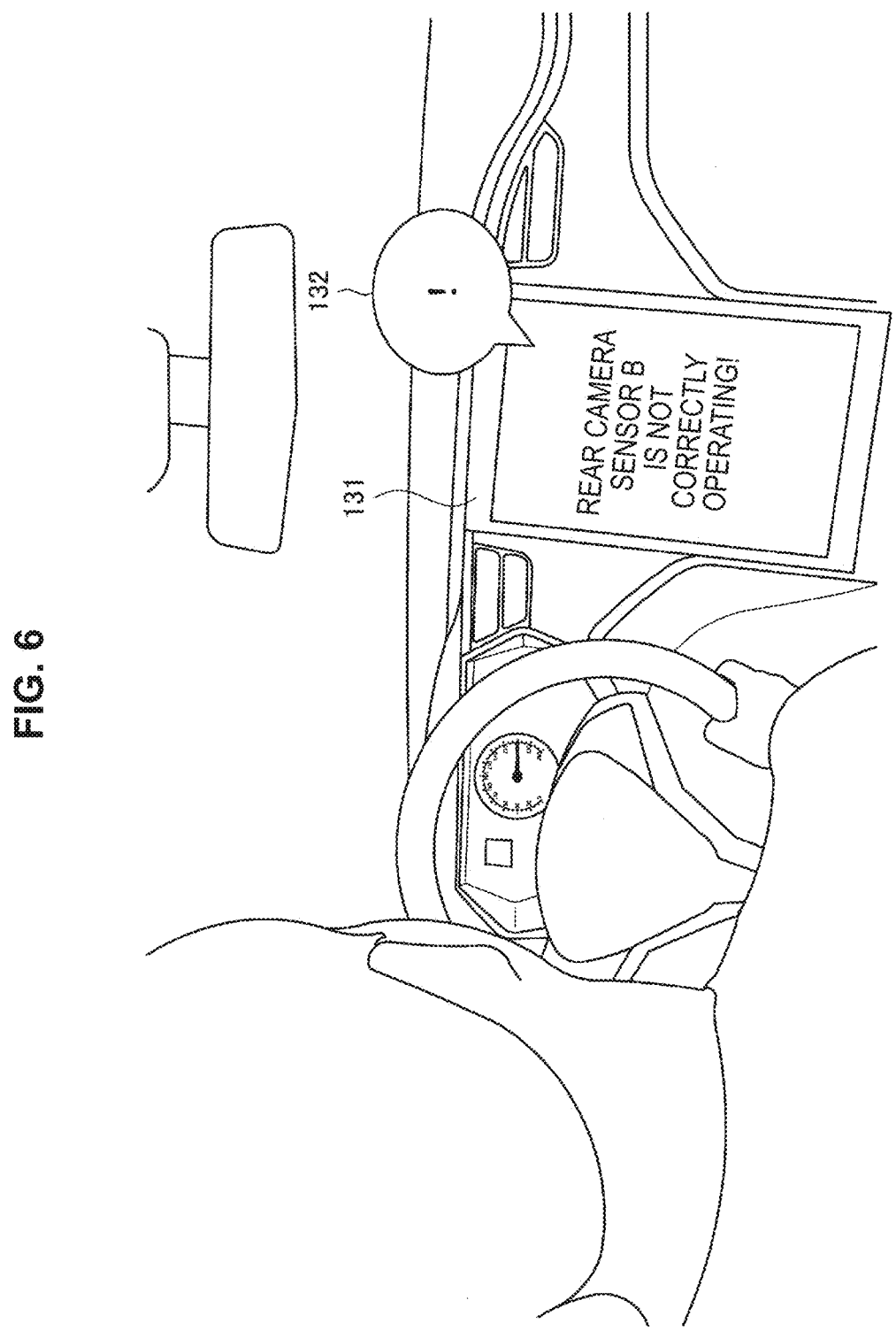
FIG. 6 is a diagram for describing a UI example according to the embodiment.

For example, the onboard sensor apparatus 100 (e.g., first notification section 130 and control section 170) notifies a driver (user) of information showing a sensor abnormality. This allows the driver to recognize the sensor abnormality of an own vehicle and address the sensor abnormality, for example, by switching automated driving to human driving, or the like. FIG. 6 illustrates a UI example related to such a notification. For example, in the case where a rear camera sensor B has an abnormality, as illustrated in FIG. 6, the onboard sensor apparatus 100 displays warning text showing that the rear camera sensor B is not correctly operating on the display 131 and outputs warning sound 132.

For example, the onboard sensor apparatus 100 (e.g., second notification section 140 and control section 170) notifies another apparatus of information showing a sensor abnormality. For example, the onboard sensor apparatus 100 notifies another sensor apparatus, an apparatus of an insurance company, an apparatus of a dealer, and a failure data base (DB) of information showing a sensor abnormality. This shares the sensor abnormality of an own vehicle in the surroundings, and causes the sensor abnormality to be appropriately addressed. For example, when a repair facility of a vehicle is notified of a sensor abnormality, the repair facility is capable of order the sensor in advance and carrying out a quick repair. In addition, when a road service provider is notified of a sensor abnormality, a driver is able to receive a road service without contacting the road service provider. In addition, when a nearby different vehicle is notified of a sensor abnormality, the different vehicle is capable of taking measures by making more space between the vehicles, or the like to avoid an accident.

(Calibration)

For example, the onboard sensor apparatus 100 (e.g., detection section 110 and control section 170) may adjust the detection section 110 to decrease an erroneous difference between first sensor information and second sensor information. Specifically, the onboard sensor apparatus 100 performs calibration by adjusting a parameter of each sensor or recognition module included in the detection section 110. For example, the onboard sensor apparatus 100 accumulates evaluation values of differences calculated with the equation (1) or equation (2) above, and performs calibration to make a change in the direction in which the accumulated evaluation values decrease. The degree of reliability may be taken into consideration for calibration. Such calibration processing allows the onboard sensor apparatus 100 to correct an abnormality of its own sensor.

(Selection of Sensor Information to be Used)

For example, the onboard sensor apparatus 100 (e.g., control section 170) may select sensor information to be used. For example, instead of first sensor information detected by the detection section 110 determined to be abnormal, the onboard sensor apparatus 100 may use the corresponding second sensor information (detected by the same type of sensor). This executes automated driving that uses only sensor information obtained, for example, by a normal sensor, and promotes the safety of the automated driving. In addition, even in the case where a sensor has an abnormality, the onboard sensor apparatus 100 is capable of causing the automated driving of an own vehicle to continue. Note that, in the case where sensor information to be used is selected, the onboard sensor apparatus 100 (e.g., first notification section 130) may notify a user of information regarding the selection. For example, the onboard sensor apparatus 100 can notify a user of information showing that information to be used is switched, information showing another sensor apparatus from which sensor information to be used is acquired, and the like.

(Automated Driving)

The onboard sensor apparatus 100 (e.g., driving control section 150 and control section 170) may perform automated driving by using shared sensor information. The onboard sensor apparatus 100 is capable of performing automated driving based on correct sensor information by performing the above-described selection processing of sensor information to be used or sensor information complementation processing.

In the case where a sensor abnormality occurs, the onboard sensor apparatus 100 (e.g., driving control section 150 and control section 170) may cause the automated driving of a vehicle (i.e., own vehicle) corresponding to the onboard sensor apparatus 100 to stop. Specifically, the onboard sensor apparatus 100 causes the own vehicle to stop or switches automated driving to human driving. This prevents automated driving using sensor information detected by an abnormal sensor from being performed.

Until automated driving is stopped, as described above, second sensor information is used for automated driving. Then, in the case where an own vehicle moves out of an area in which second information is acquired, or within the area, automated driving can be stopped. Therefore, the onboard sensor apparatus 100 (e.g., driving control section 150 and control section 170) may control an own vehicle such that the own vehicle stays longer in another sensor apparatus's detection area of second sensor information. For example, the onboard sensor apparatus 100 controls an own vehicle such that the own vehicle decreases speed, selectively travels on a road having a large number of other sensor apparatuses, and turns at a corner where the environment installation sensor apparatus 200 is installed. This extends the period before automated driving is stopped, so that a user is able to calmly prepare for human driving.

(3-2) Complementation of Sensor Information

The onboard sensor apparatus 100 (e.g., control section 170) may complement sensor information to be used. For example, the onboard sensor apparatus 100 may complement first sensor information with second sensor information acquired by a type of sensor that is not included in the detection section 110. In addition, the onboard sensor apparatus 100 may complement first sensor information with second sensor information acquired from another sensor apparatus capable of detecting the area (i.e., blind spot) that does not overlap with the area which the onboard sensor apparatus 100 is capable of detecting. Note that, in the case where sensor information is complemented, the onboard sensor apparatus 100 (e.g., first notification section 130) may notify a user of information regarding the complementation. For example, the onboard sensor apparatus 100 can notify a user of information showing that sensor information is complemented, information showing another sensor apparatus that performs complementation, and the like.

The complementation of sensor information increases the information amount of sensor information that the onboard sensor apparatus 100 is capable of using. For example, by inputting complemented second sensor information into the driving control section 150 in addition to first sensor information, the onboard sensor apparatus 100 is capable of executing safer automated driving than automated driving in the case where only first sensor information is input.

Figure 7:
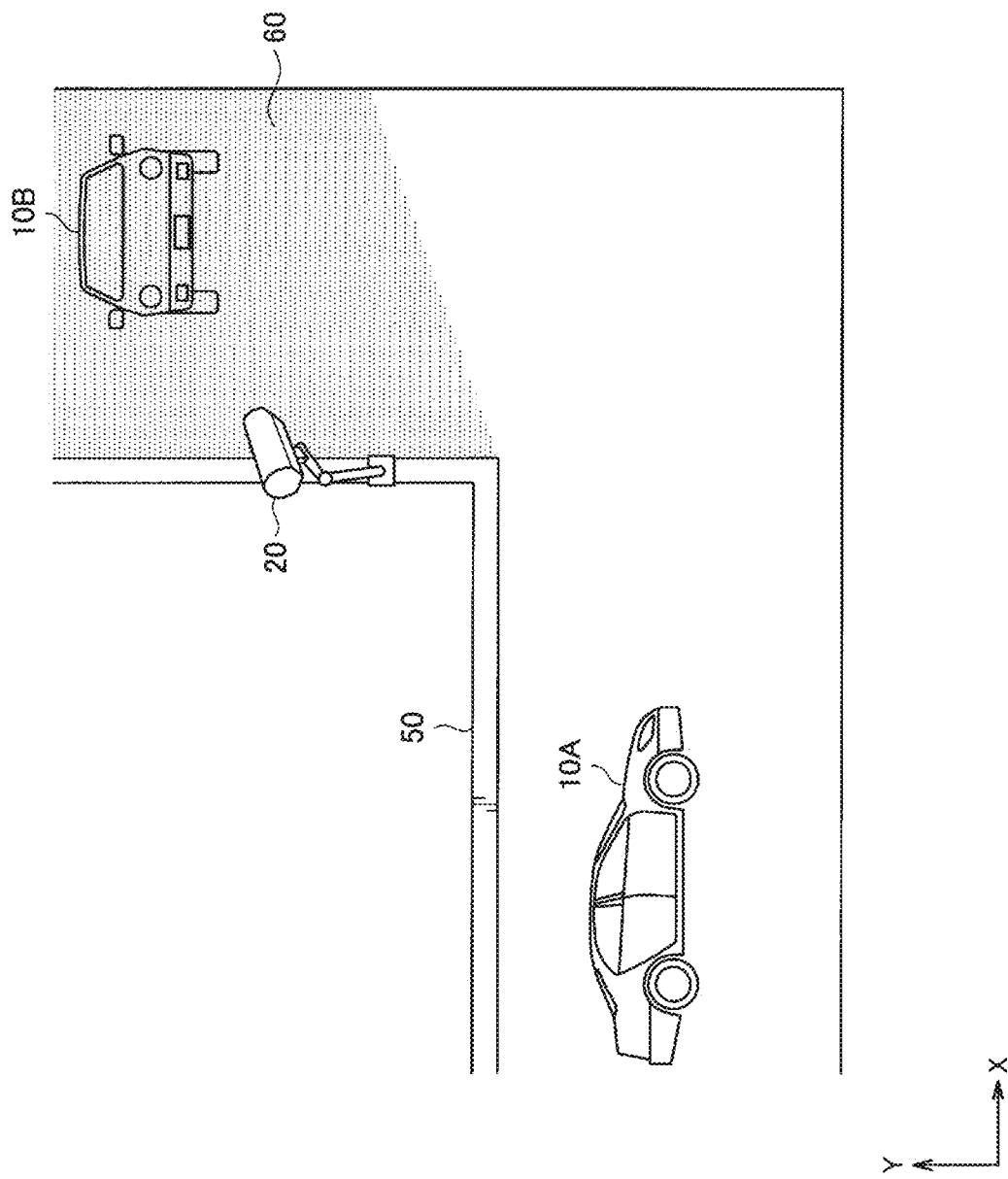
FIG. 7 is an explanatory diagram for describing sensor information complementation processing according to the embodiment.

With reference to FIG. 7, the following describes the complementation of sensor information of a blind spot.

FIG. 7 is an explanatory diagram for describing sensor information complementation processing according to the present embodiment. FIG. 7 illustrates the situation in which the vehicle 10A and the vehicle 10B are respectively traveling in the X direction and the −Y direction, and each approaching a corner. It is assumed that the vehicle 10A is provided with a sensor on the front side, and has a blind spot 60 because of the influence of a wall 50 provided on the inside of the corner. In that case, the onboard sensor apparatus 100 mounted on the vehicle 10A acquires second sensor information from the environment installation sensor apparatus 200 provided to a surveillance camera 20 that is provided in the blind spot 60 or has the blind spot 60 as a detection area, and complements first sensor information. This allows the onboard sensor apparatus 100 to perform automated driving that takes into consideration the presence of the vehicle 10B that is present in the blind spot 60, increasing an accident avoidance rate.

Additionally, the onboard sensor apparatus 100 may complement information having low accuracy (or degree of reliability) among first sensor information with second sensor information. For example, there is a great difference in brightness between the inside and outside of a tunnel at the entrance and exit of the tunnel, so that it is difficult for an own vehicle in the tunnel to correctly detect the situation of the outside of the tunnel. Therefore, the onboard sensor apparatus 100 may acquire second sensor information from another sensor apparatus present outside the tunnel, and complement first sensor information. In addition, in the case where another sensor apparatus simply has higher sensor accuracy than that of the onboard sensor apparatus 100, the onboard sensor apparatus 100 may complement first sensor information with second sensor information acquired from the other sensor apparatus.

(3-3) Prediction

The onboard sensor apparatus 100 (e.g., control section 170) may perform prediction on the basis of sensor information.

For example, the onboard sensor apparatus 100 may predict future sensor information. More specifically, the onboard sensor apparatus 100 may predict the position, size, type, speed, acceleration, or moving direction of a mobile object. Additionally, the onboard sensor apparatus 100 may predict biological information of a driver. In addition, the onboard sensor apparatus 100 may predict the degree of reliability. Further, these prediction values may be included in shared sensor information. Needless to say, the onboard sensor apparatus 100 can similarly perform the above-described processing based on a comparison result and the complementation of sensor information regarding this prediction value.

For example, the onboard sensor apparatus 100 may predict the correlation between respective vehicles on the basis of the above-described prediction of sensor information. For example, the onboard sensor apparatus 100 can predict the distance between an own vehicle and a different vehicle, approaching speed, approaching acceleration, or the like.

(3-4) Others

Additionally, the onboard sensor apparatus 100 (e.g., control section 170) can perform various kinds of processing on the basis of sensor information. For example, the onboard sensor apparatus 100 can perform various kinds of processing such as estimating the position of an own vehicle, estimating collision probability, recognizing the type of object, and checking a system condition on the basis of sensor information.

The above describes technical features of the onboard sensor apparatus 100 according to the present embodiment. The environment installation sensor apparatus 200 can also have the above-described technical features similarly except for a feature regarding automated driving.

<2.4. Flow of Processing>

Next, with reference to FIGS. 8 to 13, the flow of processing executed in the onboard sensor apparatus 100 according to the present embodiment will be described.

(1) Overall Processing

Figure 8:
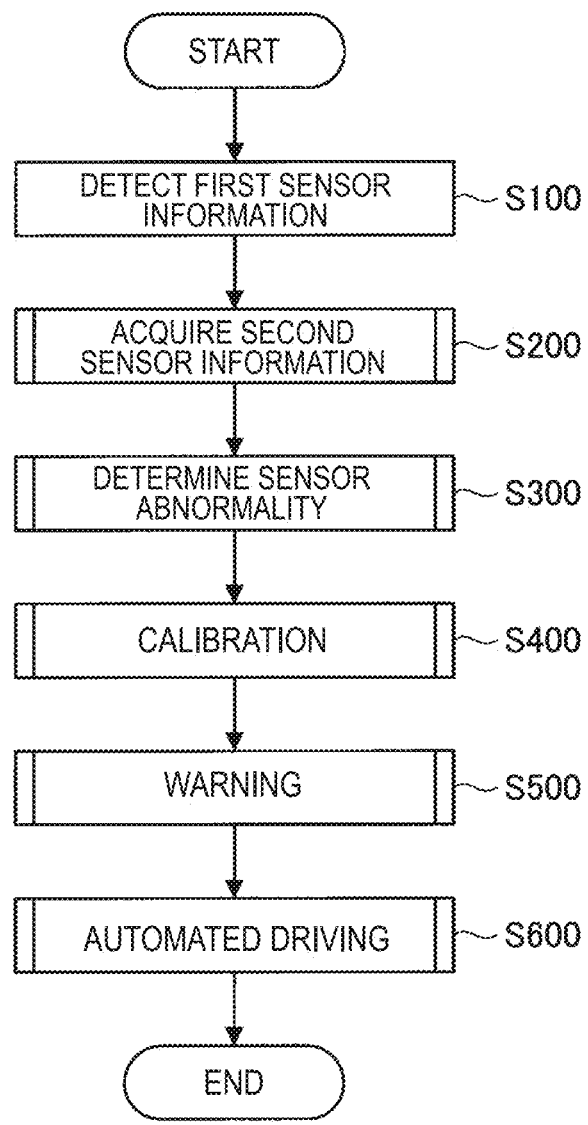
FIG. 8 is a flowchart illustrating an example of a flow of information processing executed in the onboard sensor apparatus according to the embodiment.

FIG. 8 is a flowchart illustrating an example of the flow of information processing executed in the onboard sensor apparatus 100 according to the present embodiment.

As illustrated in FIG. 8, the detection section 110 first detects first sensor information (step S100). Next, the acquisition section 120 acquires second sensor information (step S200)). The control section 170 then compares the first sensor information and the second sensor information to determine a sensor abnormality by (step S300), and performs calibration (step S400). Next, the control section 170 notifies a user and/or another apparatus of a warning showing an abnormality of the detection section 110 (step S500). The driving control section 150 then performs automated driving (step S600). The above describes an example of the flow of the overall processing. Next, the flow of the detailed processing in each step will be described.

(2) Acquisition Processing of Second Sensor Information

First, a first example will be described with reference to FIG. 9, and then a second example will be described with reference to FIG. 10.

(2-1) First Example

Figure 9:
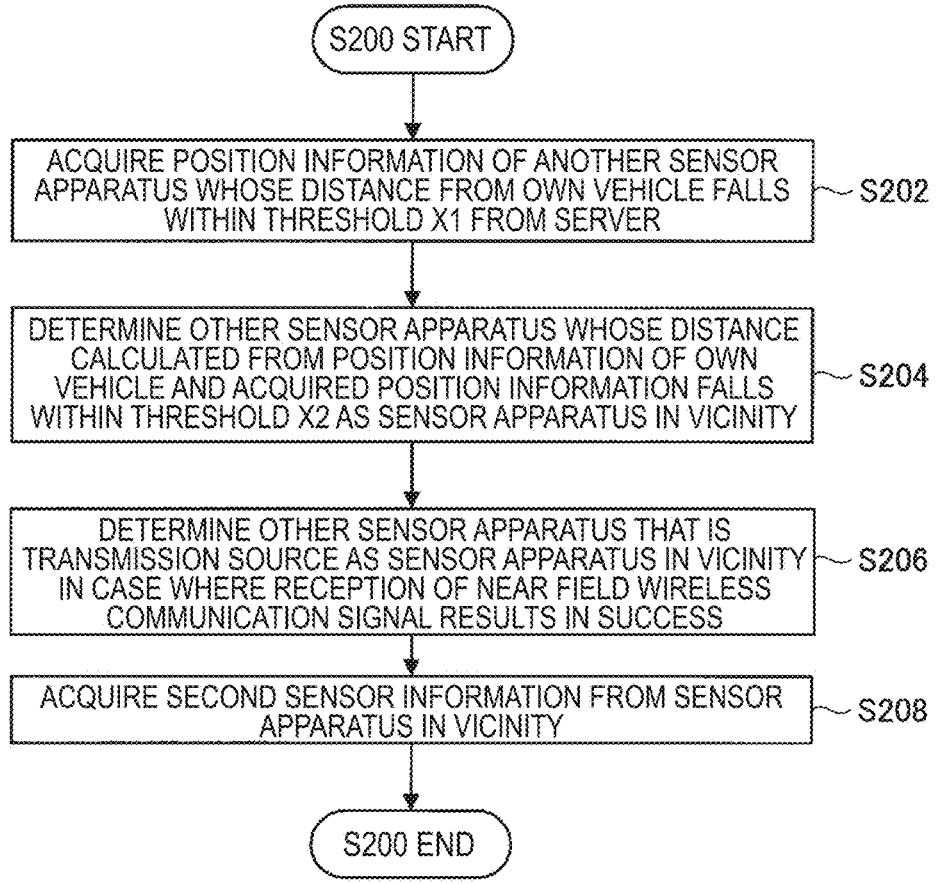
FIG. 9 is a flowchart illustrating an example of a flow of acquisition processing of second sensor information executed in the onboard sensor apparatus according to the embodiment.

FIG. 9 is a flowchart illustrating an example of the flow of acquisition processing of second sensor information executed in the onboard sensor apparatus 100 according to the present embodiment. The present flow shows the detailed flow of processing in step S200 in FIG. 8.

As illustrated in FIG. 9, the acquisition section 120 first acquires position information of another sensor apparatus whose distance from an own vehicle falls within a threshold X1 from the server 30 (step S202). Next, the control section 170 calculates the distance between the own vehicle and the other sensor apparatus from position information of the own vehicle and the position information acquired from the server 30, and determines the other sensor apparatus whose calculated distance falls within a threshold X2 as a sensor apparatus in the vicinity (step S204).

In addition, in the case where the acquisition section 120 succeeds in receiving a near field wireless communication signal from another sensor apparatus, the control section 170 determines the other sensor apparatus that is the transmission source as a sensor apparatus in the vicinity (step S206).

The acquisition section 120 then acquires second sensor information from the sensor apparatus in the vicinity (step S208).

(2-2) Second Example

Figure 10:
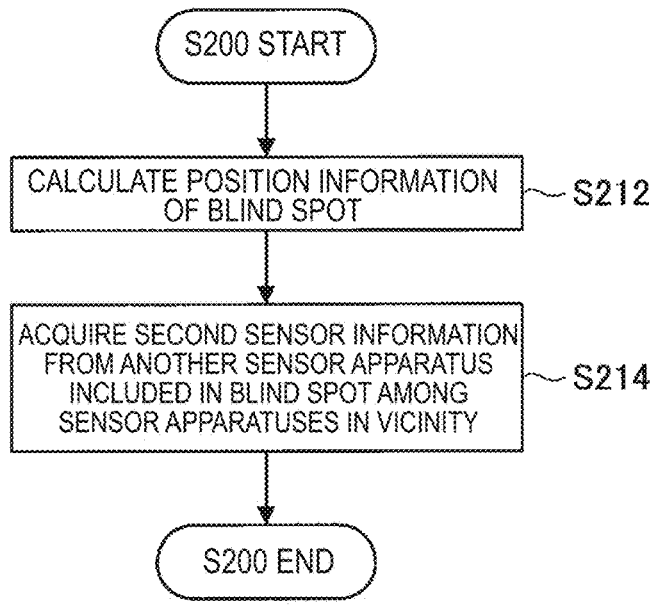
FIG. 10 is a flowchart illustrating an example of a flow of the acquisition processing of the second sensor information executed in the onboard sensor apparatus according to the embodiment.

FIG. 10 is a flowchart illustrating an example of the flow of acquisition processing of second sensor information executed in the onboard sensor apparatus 100 according to the present embodiment. The present flow shows the detailed flow of processing in step S200 in FIG. 8.

As illustrated in FIG. 10, the control section 170 first calculates position information of a blind spot (step S212). For example, the control section 170 recognizes an obstacle such as a wall on the basis of a captured image obtained by imaging the area in front of an own vehicle, and calculates position information of the area behind the recognized obstacle on the basis of position information of the own vehicle.

The control section 170 then acquires second sensor information from another sensor apparatus having position information included in the calculated position information of the blind spot among the sensor apparatuses in the vicinity (step S214). Note that the determination of a sensor apparatus in the vicinity can be made similarly to the processing described above with reference to FIG. 9.

(3) Sensor Abnormality Determination Processing

Figure 11:
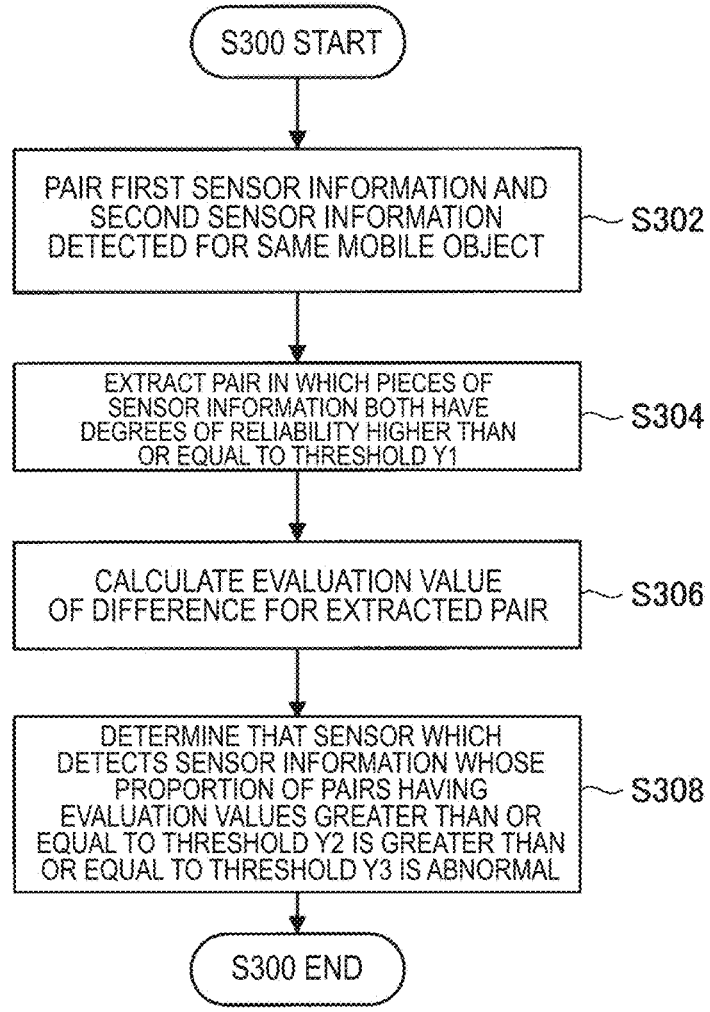
FIG. 11 is a flowchart illustrating an example of a flow of sensor abnormality determination processing executed in the onboard sensor apparatus according to the embodiment.

FIG. 11 is a flowchart illustrating an example of the flow of sensor abnormality determination processing executed in the onboard sensor apparatus 100 according to the present embodiment. The present flow shows the detailed flow of processing in step S300 in FIG. 8.

As illustrated in FIG. 11, the control section 170 first pairs first sensor information and second sensor information detected for the same mobile object (step S302). In the case where second sensor information is acquired from a plurality of other sensor apparatuses, a plurality of pairs are generated.

Next, the control section 170 extracts a pair in which the pieces of sensor information both have the degrees of reliability higher than or equal to a threshold Y1 from the plurality of pairs (step S304). Next, the control section 170 calculates an evaluation value of a difference for the extracted pair (step S306). For example, the equation (1) or equation (2) above can be used for this calculation.

The control section 170 then determines that a sensor which detects sensor information whose proportion of pairs having evaluation values greater than or equal to the threshold Y2 is greater than or equal to a threshold Y3 is abnormal (step S308).

(4) Calibration Processing

Figure 12:
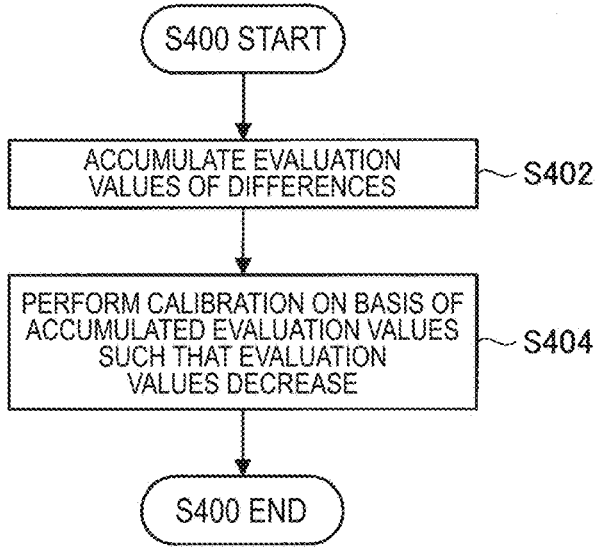
FIG. 12 is a flowchart illustrating an example of a flow of calibration processing executed in the onboard sensor apparatus according to the embodiment.

FIG. 12 is a flowchart illustrating an example of the flow of calibration processing executed in the onboard sensor apparatus 100 according to the present embodiment. The present flow shows the detailed flow of processing in step S400 in FIG. 8.

As illustrated in FIG. 12, the control section 170 first accumulates evaluation values of differences calculated in step S306 above (step S402). The control section 170 then performs calibration on the basis of the accumulated evaluation values such that the evaluation values decrease (step S404).

(5) Warning Processing FIG. 8 is a flowchart illustrating an example of the flow of warning processing executed in the onboard sensor apparatus according to the present embodiment. The present flow shows the detailed flow of processing in step S500 in FIG. 8.

Figure 13:
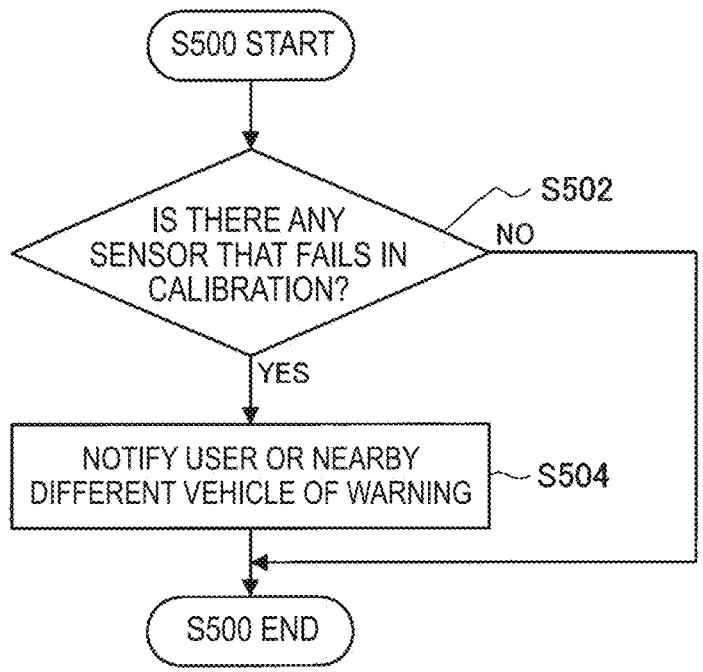
FIG. 13 is a flowchart illustrating an example of a flow of warning processing executed in the onboard sensor apparatus according to the embodiment.

As illustrated in FIG. 13, the control section 170 first determines whether there is a sensor that fails in calibration in step S400 above or not (step S502).

In the case where there is a sensor that fails in calibration (step S502/YES), the control section 170 controls the first notification section 130 or the second notification section 140 such that a user or a nearby different vehicle is notified of a warning showing that a sensor abnormality occurs (step S504). In the case where there is no sensor that fails in calibration (step S502/NO), the control section 170 issues no warning.

(6) Automated Driving Processing

Figure 14:
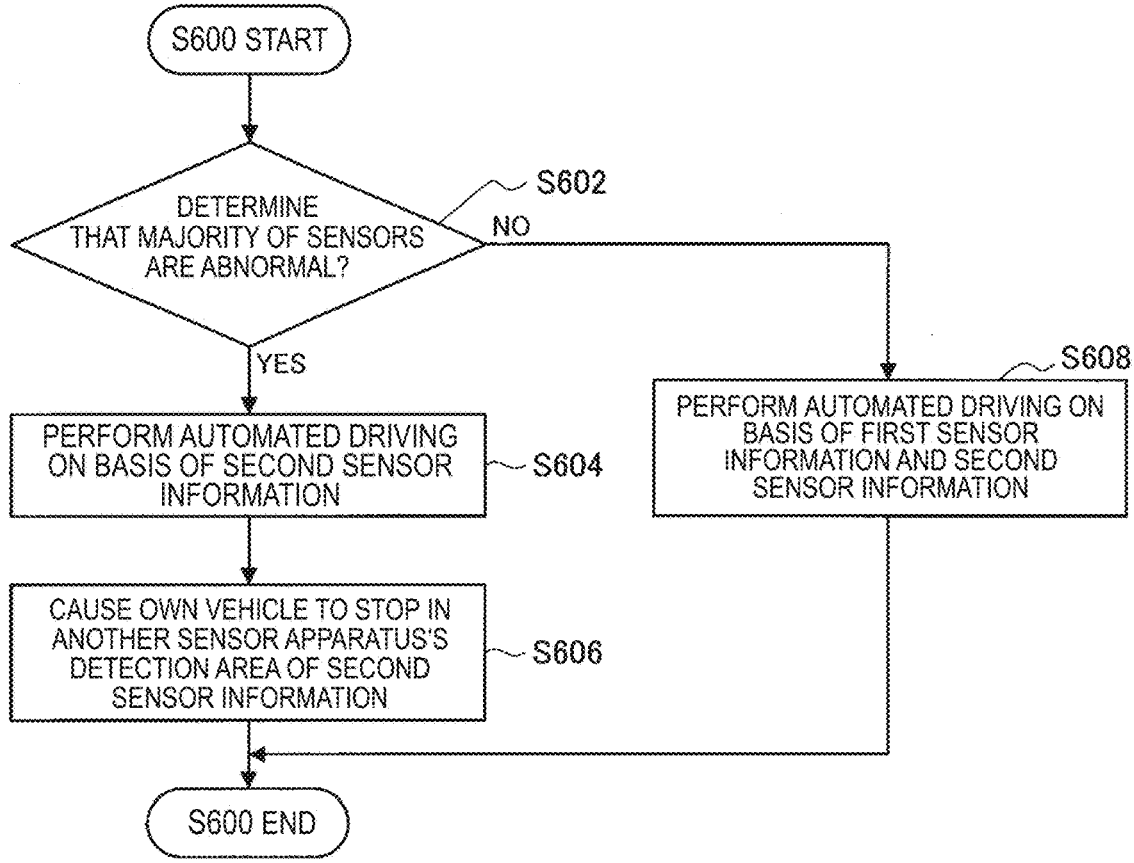
FIG. 14 is a flowchart illustrating an example of a flow of automated driving processing executed in the onboard sensor apparatus according to the embodiment.

FIG. 14 is a flowchart illustrating an example of the flow of automated driving processing executed in the onboard sensor apparatus 100 according to the present embodiment. The present flow shows the detailed flow of processing in step S600 in FIG. 8.

As illustrated in FIG. 14, the control section 170 first determines whether it is determined whether the majority of the sensors included in the detection section 110 are abnormal or not (step S602).

In the case where it is determined that the majority of the sensors are abnormal (step S602/YES), the driving control section 150 performs automated driving on the basis of second sensor information (step S604). The control section 170 then causes an own vehicle to stop in another sensor apparatus's detection area of second sensor information (step S606).

In contrast, in the case where it is determined that the majority of the sensors are normal (step S602/NO), the driving control section 150 performs automated driving on the basis of first sensor information and second sensor information (step S608).

4. Hardware Configuration Example

The technology according to the present disclosure is applicable to a variety of products. For example, the onboard sensor apparatus 100 may be implemented as an apparatus mounted on any type of vehicle such as an automobile, an electric vehicle, a hybrid electric vehicle, or a motorcycle. In addition, at least some components of the onboard sensor apparatus 100 may be implemented in a module (e.g., integrated circuit module including one die) for an apparatus mounted on a vehicle.

In addition, the environment installation sensor apparatus 200 may be implemented as an apparatus such as a traffic light, a surveillance camera, a digital signage, or an electronic message board that is installed in an environment. In addition, at least some components of the environment installation sensor apparatus 200 may be implemented in a module (e.g., integrated circuit module including one die) for an apparatus installed in an environment.

<4.1. Configuration Example of Vehicle Control System>

Figure 15:
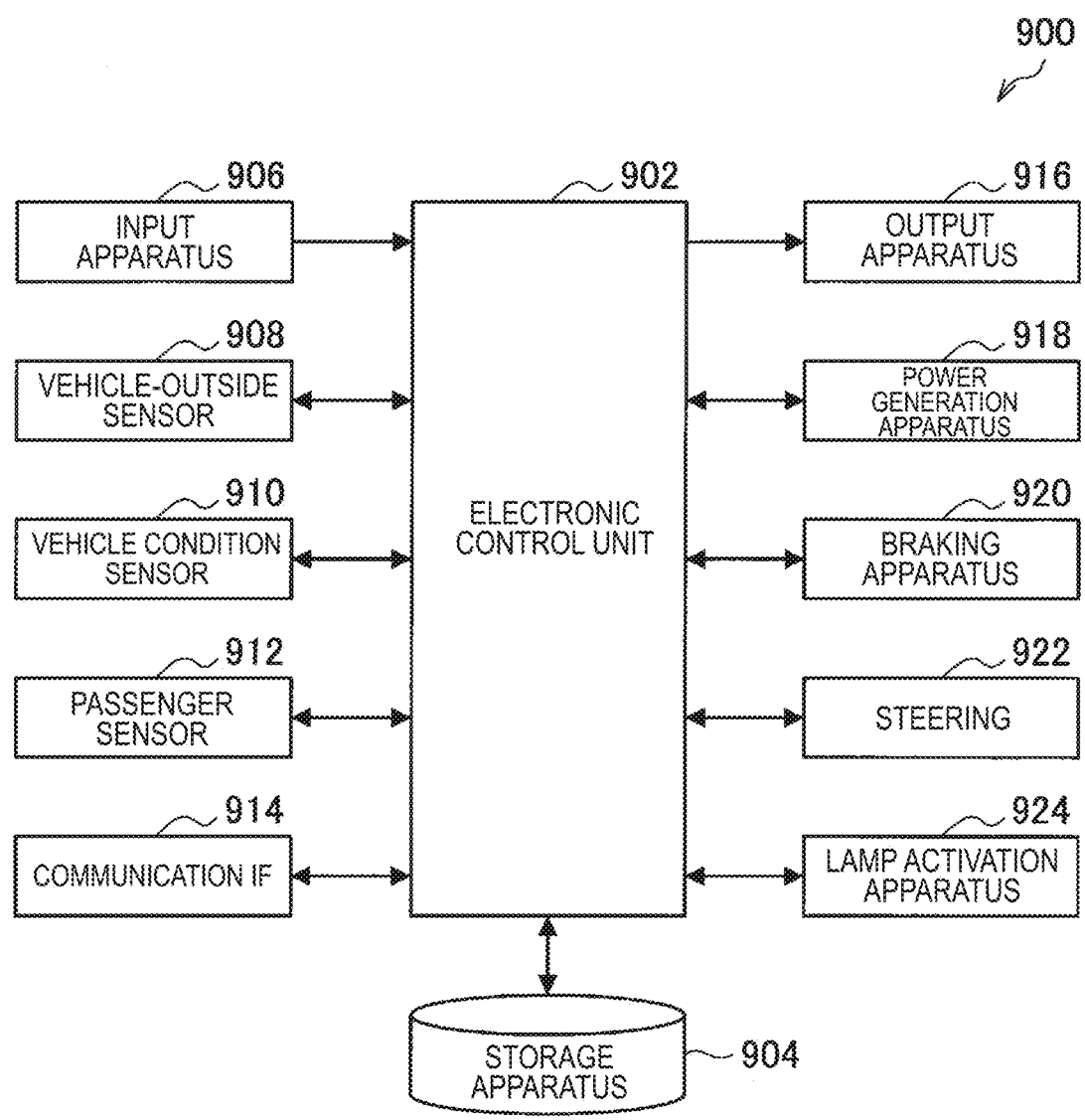
FIG. 15 is a block diagram illustrating an example of a hardware configuration of a vehicle system.

FIG. 15 is a block diagram illustrating an example of a schematic configuration of a vehicle control system 900 to which the technology according to the present disclosure can be applied. The vehicle control system 900 illustrated in FIG. 15 can implement, for example, the onboard sensor apparatus 100 illustrated in FIG. 2. The vehicle control system 900 includes an electronic control unit 902, a storage apparatus 904, an input apparatus 906, a vehicle-outside sensor 908, a vehicle condition sensor 910, a passenger sensor 912, a communication IF 914, an output apparatus 916, a power generation apparatus 918, a braking apparatus 920, a steering 922, and a lamp activation apparatus 924.

The electronic control unit 902 functions as an operation processing apparatus and a control apparatus, and controls the overall operation of the vehicle control system 900 in accordance with a variety of programs. The electronic control unit 902 can be configured as an electronic control unit (ECU) along with the storage apparatus 904 described below. A plurality of ECUs (i.e., electronic control unit 902 and storage apparatus 904) may be included in the vehicle control system 900. For example, ECUs for controlling each of various sensors or various drive systems may be provided thereto, and an ECU for controlling the plurality of those ECUs in cooperative manner may be further provided. The plurality of these ECUs are connected via an in-vehicle communication network such as a controller area network (CAN), a local interconnect network (LIN), a local area network (LAN), or Flexray (registered trademark) that is compliant with any standard. The electronic control unit 902 can be included, for example, in the driving control section 150 or the control section 170 illustrated in FIG. 2.

The storage apparatus 904 is an apparatus for data storage which is configured as an example of a storage section of the vehicle control system 900. The storage apparatus 904 is implemented, for example, as a magnetic storage device such as a HDD, a semiconductor storage device, an optical storage device, a magneto-optical storage device, or the like. The storage apparatus 904 may include a recording medium, a recording apparatus that records data in the recording medium, a readout apparatus that reads out data from the recording medium, and a deletion apparatus that deletes data recoded in the recording medium. The storage apparatus 904 stores a program to be executed by the electronic control unit 902, various types of data, various types of data acquired from the outside, and the like. The storage apparatus 904 can be included, for example, in the storage section 160 illustrated in FIG. 2.

The input apparatus 906 is implemented by an apparatus such as a mouse, a keyboard, a touch panel, a button, a microphone, a switch, and a lever into which a passenger (driver or occupant) inputs information. In addition, the input apparatus 906 may be, for example, a remote control apparatus using infrared light or other radio waves, or may be an external connection device such as a mobile phone or a PDA corresponding to the operation of the vehicle control system 900. In addition, the input apparatus 906 may be, for example, a camera. In that case, a passenger can input information according to gesture. Further, the input apparatus 906 may include an input control circuit or the like that generates an input signal, for example, on the basis of information input by a user using the above-described input means, and outputs the generated input signal to the electronic control unit 902. The passenger is able to input various kinds of data to the vehicle control system 900 or instruct the vehicle control system 900 about a processing operation by operating this input apparatus 906. The input apparatus 906 can be included, for example, in the detection section 110 illustrated in FIG. 2.

The vehicle-outside sensor 908 is implemented by a sensor that detects information of the outside of the vehicle. For example, the vehicle-outside sensor 908 may include a sonar apparatus, a radar apparatus, a light detection and ranging or laser imaging detection and ranging (LIDAR) apparatus, a camera, a stereo-camera, a time of flight (ToF) camera, an infrared sensor, an environment sensor, a microphone, or the like. The vehicle-outside sensor 908 can be included, for example, in the detection section 110 illustrated in FIG. 2.

The vehicle condition sensor 910 is implemented by a sensor that detects information regarding the vehicle condition. For example, the vehicle condition sensor 910 may include a sensor that detects an operation performed by a driver such as an accelerator opening degree, brake stepping force, or a steering wheel angle. In addition, the vehicle condition sensor 910 may include a sensor that detects the condition of a power source such as the rotation speed or torque of an internal combustion engine or a motor. In addition, the vehicle condition sensor 910 may include a sensor such as a gyro sensor or an acceleration sensor for detecting information regarding the movement of the vehicle. In addition, the vehicle condition sensor 910 may include a global navigation satellite system (GNSS) module that receives GNSS signals (e.g., global positioning system (GPS) signals from a GPS satellite) from a GNSS satellite, and measures position information including the latitude, longitude, and altitude of the apparatus. Note that, with respect to the position information, the vehicle condition sensor 910 may detect the position through Wi-Fi (registered trademark), transmission and reception to and from a mobile phone/PHS/smartphone or the like, near field communication, or the like. The vehicle condition sensor 910 can be included, for example, in the detection section 110 illustrated in FIG. 2.

The passenger sensor 912 can be implemented by a sensor that detects information regarding a passenger. For example, the passenger sensor 912 may include a camera, a microphone, and an environment sensor provided to a vehicle compartment. In addition, the passenger sensor 912 may include a biological sensor that detects biological information of a passenger. The biological sensor is attached, for example, to a seating face, the steering wheel, or the like, and is capable of detecting biological information of the passenger sitting on the seat or the driver gripping the steering. The passenger sensor 912 can be included, for example, in the detection section 110 illustrated in FIG. 2.

Note that various sensors such as the vehicle-outside sensor 908, the vehicle condition sensor 910, and the passenger sensor 912 each output information showing a detection result to the electronic control unit 902. These various sensors may set the sensing area, accuracy, or the like on the basis of the control of the electronic control unit 902. In addition, these various sensors may include a recognition module that performs recognition processing based on raw data such as processing of recognizing the driving position of an own vehicle on a road, for example, on the basis of the position of a lane line included in a taken captured image.

The communication IF 914 is a communication interface that mediates communication performed by the vehicle control system 900 with another apparatus. The communication IF 914 can include, for example, a V2X communication module. Note that V2X communication is a concept including vehicle-to-vehicle communication and vehicle-to-infrastructure communication. Additionally, the communication IF 914 may also include a communication module for a wireless local area network (LAN), Wi-Fi (registered trademark), 3G, long term evolution (LTE), Bluetooth (registered trademark), near field communication (NFC) or wireless USB (WUSB). This communication IF 914 is capable of transmitting and receiving signals or the like, for example, to and from the Internet or other communication devices outside the vehicle in compliance with a predetermined protocol such as TCP/IP. The communication IF 914 can be included, for example, in the acquisition section 120 or the second notification section 140 illustrated in FIG. 2.

The output apparatus 916 is implemented as an apparatus capable of visually or aurally notifying a passenger of acquired information. Such an apparatus includes a display apparatus such as an instrument panel, a head-up display, a projector or a lamp, and a sound output apparatus such as a speaker or headphones. Specifically, the display apparatus visually displays results obtained from various kinds of processing performed by the vehicle control system 900 in a variety of forms such as text, an image, a table, and a graph. At that time, a virtual object such as an augmented reality (AR) object may be displayed. Meanwhile, the audio output apparatus converts audio signals including reproduced audio data, acoustic data, or the like into analog signals, and aurally outputs the analog signals. The above-described display apparatus or the above-described sound output apparatus can be included, for example, in the first notification section 130 illustrated in FIG. 2.

The power generation apparatus 918 is an apparatus for generating driving force for the vehicle. The power generation apparatus 918 may be implemented, for example, as an internal combustion engine. In that case, the power generation apparatus 918 performs start control, stop control, throttle valve opening degree control, fuel injection control, exhaust gas recirculation (EGR) control, or the like on the basis of a control command from an electronic control unit 902. In addition, the power generation apparatus 918 may be implemented, for example, as a motor, an inverter, and a battery. In that case, the power generation apparatus 918 can supply electric power from the battery to the motor via the inverter on the basis of a control command from the electronic control unit 902, and perform a motor operation (so-called powering) to output positive torque and a regenerative operation to cause the motor to absorb torque to generate electric power, and charge the battery.

The braking apparatus 920 is an apparatus for providing braking force to the vehicle, or causing the vehicle to decelerate or stop. The braking apparatus 920 can include, for example, a brake installed at each wheel, and a brake pipe for transmitting the force of stepping on the brake pedal to the brake, an electronic circuit or the like. In addition, the braking apparatus 920 may include a control apparatus such as an antilock brake system (ABS) or an electronic stability control (ESC) for activating a mechanism of preventing a slide or a skid caused by brake control.

The steering 922 is an apparatus for controlling the advancing direction (steering angle) of the vehicle. The steering 922 can include, for example, a steering wheel, a steering shaft, a steering gear, a tie rod, and the like. In addition, the steering 922 can include a power steering for assisting a driver in steering. Further, the steering 922 can include a power source such as a motor for allowing for automatic steering.

The lamp activation apparatus 924 is an apparatus that activates various lamps such as ahead light, a blinker, a position lamp, a fog light, or a stop lamp. The lamp activation apparatus 924 controls, for example, the blinking of the lamps, the amount of light, the light-emitting direction, or the like.

Note that the power generation apparatus 918, the braking apparatus 920, the steering 922, and the lamp activation apparatus 924 may come into operation on the basis of a manual operation performed by a driver or on the basis of an automatic operation performed by the electronic control unit 902.

<4.2. Configuration Example of Information Processing Apparatus>

Figure 16:
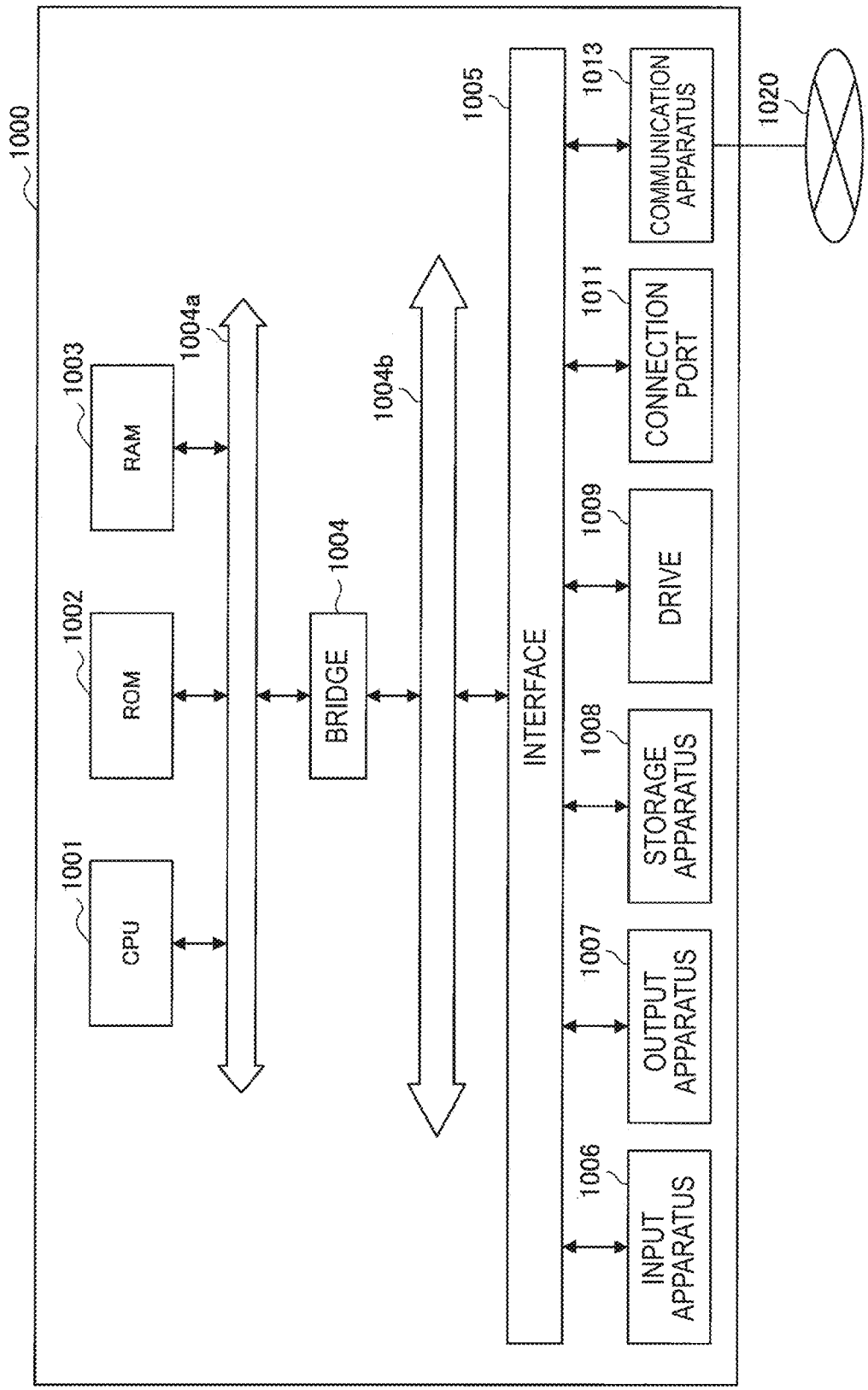
FIG. 16 is a block diagram illustrating an example of a hardware configuration of an information processing apparatus.

FIG. 16 is a block diagram illustrating an example of a hardware configuration of an information processing apparatus according to the present embodiment. An information processing apparatus 1000 illustrated in FIG. 16 can implement, for example, the environment installation sensor apparatus 200 illustrated in FIG. 3. Information processing performed by the environment installation sensor apparatus 200 according to the present embodiment is implemented by software in cooperation with hardware described below.

As illustrated in FIG. 16, the information processing apparatus 1000 includes a central processing unit (CPU) 1001, a read only memory (ROM) 1002, a random access memory (RAM) 1003, and a host bus 1004a. In addition, the information processing apparatus 1000 includes a bridge 1004, an external bus 1004b, an interface 1005, an input apparatus 1006, an output apparatus 1007, a storage apparatus 1008, a drive 1009, a connection port 1011, and a communication apparatus 1013. The information processing apparatus 1000 may include a processing circuit such as a DSP or an ASIC instead of or in combination with the CPU 1001.

The CPU 1001 functions as an operation processing apparatus and a control apparatus, and controls the overall operation of the information processing apparatus 1000 in accordance with a variety of programs. In addition, the CPU 1001 may be a microprocessor. The ROM 1002 stores programs, operation parameters, and the like that the CPU 1001 uses. The RAM 1003 temporarily stores programs used in the execution of the CPU 1001 and the parameters and the like that appropriately changes during the execution. The CPU 1001 can be included, for example, in the control section 260 illustrated in FIG. 3.

The CPU 1001, the ROM 1002, and the RAM 1003 are connected to each other by the host bus 1004a including a CPU bus and the like. The host bus 1004a is connected to the external bus 1004b such as a peripheral component interconnect/interface (PCI) bus through the bridge 1004. Note that, the host bus 1004a, the bridge 1004, and the external bus 1004b are not necessarily configured as separate components, but the functions thereof may be implemented in one bus.

The input apparatus 1006 is implemented by an apparatus with which a user inputs information, such as a mouse, a keyboard, a touch panel, a button, a microphone, a switch, and a lever. In addition, the input apparatus 1006 may be, for example, a remote control apparatus using infrared light or other radio waves, or may be an external connection device such as a mobile phone or a PDA corresponding to the operation of the information processing apparatus 1000. Further, the input apparatus 1006 may include, for example, an input control circuit or the like that generates an input signal on the basis of information input by a user using the above-described input means, and outputs the input signal to the CPU 1001. A user of the information processing apparatus 1000 is able to input various kinds of data to the information processing apparatus 1000 and instruct the information processing apparatus 1000 about a processing operation by operating this input apparatus 1006.

Additionally, the input apparatus 1006 can include an apparatus that detects various kinds of information. For example, the input apparatus 1006 can include a variety of sensors such as an image sensor (e.g., camera), a depth sensor (e.g., stereo-camera), an acceleration sensor, a gyro sensor, a geomagnetic sensor, an optical sensor, a sound sensor, a distance measuring sensor, and a force sensor. In addition, the input apparatus 1006 may acquire information regarding the state of the information processing apparatus 1000 itself, such as the attitude and moving speed of the information processing apparatus 1000, and information regarding the environment around the information processing apparatus 1000, such as the brightness and noise around the information processing apparatus 1000. In addition, the input apparatus 1006 may include a global navigation satellite system (GNSS) module that receives, for example, GNSS signals (such as global positioning system (GPS) signals from a GPS satellite) from a GNSS satellite, and measures position information including the latitude, longitude, and altitude of the apparatus. In addition, with respect to the position information, the input apparatus 1006 may detect the position through Wi-Fi (registered trademark), transmission and reception to and from a mobile phone/PHS/smartphone, near field communication, or the like.

The input apparatus 1006 can be included, for example, in the detection section 210 illustrated in FIG. 3.

The output apparatus 1007 includes an apparatus capable of visually or aurally notifying a user of acquired information. Such an apparatus includes a display apparatus such as a CRT display apparatus, a liquid crystal display apparatus, a plasma display apparatus, an EL display apparatus, a laser projector, an LED projector and a lamp, an audio output apparatus such as a speaker and a headphone, a printer apparatus, or the like. The output apparatus 1007 outputs, for example, results obtained from various kinds of processing performed by the information processing apparatus 1000. Specifically, the display apparatus visually displays results obtained from various kinds of processing performed by the information processing apparatus 1000 in a variety of forms such as text, an image, a table, and a graph. Meanwhile, the audio output apparatus converts audio signals including reproduced audio data, acoustic data, or the like into analog signals, and aurally outputs the analog signals. The above-described display apparatus or the above-described sound output apparatus can be included, for example, in the first notification section 230 illustrated in FIG. 3.

The storage apparatus 1008 is an apparatus for data storage which is configured as an example of a storage section of the information processing apparatus 1000. The storage apparatus 1008 is implemented, for example, as a magnetic storage device such as a HDD, a semiconductor storage device, an optical storage device, a magneto-optical storage device, or the like. The storage apparatus 1008 may include a recording medium, a recording apparatus that records data in the recording medium, a readout apparatus that reads out data from the recording medium, and a deletion apparatus that deletes data recoded in the recording medium. The storage apparatus 1008 stores a program to be executed by the CPU 1001, various kinds of data, various kinds of data acquired from the outside, and the like. The storage apparatus 1008 can be included, for example, in the storage section 250 illustrated in FIG. 3.

The drive 1009 is a reader/writer for a storage medium, and is built in or externally attached to the information processing apparatus 1000. The drive 1009 reads out information recorded on a removable storage medium such as a mounted magnetic disk, an optical disc, a magneto-optical disk, and semiconductor memory, and outputs the read-out information to the RAM 1003. In addition, the drive 1009 is also capable of writing information into a removable storage medium.

The connection port 1011 is an interface connected to an external device and is a port for connecting an external device that is capable of data transmission through, for example, a universal serial bus (USB).

The communication apparatus 1013 is, for example, a communication interface including a communication device and the like for a connection to a network 1020. The communication apparatus 1013 may be, for example, a communication card for a wired or wireless local area network (LAN), Long Term Evolution (LTE), Bluetooth (registered trademark), a wireless USB (WUSB), or the like. In addition, the communication apparatus 1013 may be a router for optical communication, a router for an asymmetric digital subscriber line (ADSL), a modem for various kinds of communication, or the like. This communication apparatus 1013 is capable of transmitting and receiving signals or the like, for example, to and from the Internet or other communication devices in compliance with a predetermined protocol such as TCP/IP. The communication apparatus 1013 can be included, for example, in the acquisition section 220 or the second notification section 240 illustrated in FIG. 3.

Note that, the network 1020 is a wired or wireless transmission path through which information is transmitted from an apparatus connected to the network 1020. The network 1020 may include public networks such as the Internet, telephone networks and satellite networks, a variety of local area networks (LANs) including Ethernet (registered trademark), and wide area networks (WANs). In addition, the network 1020 may also include leased line networks such as Internet protocol-virtual private networks (IP-VPNs).

<4.3. Supplemental Information>

The above shows an example of the hardware configuration that is capable of executing the functions of the onboard sensor apparatus 100 or the environment installation sensor apparatus 200 according to the present embodiment. Each of the above-described components may be configured with a general-purpose member, and may also be configured with hardware specialized in the function of each component. Thus, the hardware configuration used can be modified as appropriate in accordance with the technological level at the time of the implementation of the present embodiment.

Note that it is possible to manufacture a computer program for executing each function of the onboard sensor apparatus 100 or the environment installation sensor apparatus 200 according to the present embodiment as described above, and implement the computer program in the ECU, the PC, or the like. In addition, there can also be provided a computer-readable recording medium having such a computer program stored therein. Examples of the recording medium include a magnetic disk, an optical disc, a magneto-optical disk, a flash memory, and the like. In addition, the computer program may also be distributed via a network, for example, using no recording medium.

4. Conclusion

An embodiment of the present disclosure has been described above in detail with reference to FIGS. 1 to 16. As described above, a sensor apparatus according to the present embodiment detects first sensor information, acquires second sensor information, and controls processing based on a comparison result of the first sensor information and the second sensor information detected for the same mobile object. This allows the sensor apparatus to appropriately handle a difference in detection results from a sensor apparatus that is different.

For example, the sensor apparatus can determine an abnormality of a sensor on the basis of a comparison result. This allows the sensor apparatus to autonomously discover an abnormality of a sensor that can be caused by a variety of factors, and automatically correct the sensor to be normal.

For example, the sensor apparatus may notify a driver or another nearby apparatus of an abnormality of a sensor. This allows a driver of an own vehicle or a different vehicle to recognize a sensor abnormality of the own vehicle and take appropriate measures. It is possible to take measures in the stage of a sensor abnormality before a fatal accident, so that it is possible to prevent an accident.

For example, instead of first sensor information detected by a sensor determined to be abnormal, the sensor apparatus is capable of using second sensor information. This allows the sensor apparatus to continue a service such as automated driving by using the second sensor information even in the case where a sensor abnormality occurs.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above-described embodiment, as an example of the sensor apparatus, the onboard sensor apparatus 100 and the environment installation sensor apparatus 200 are included. However, the present technology is not limited to the example. For example, the sensor apparatus is mountable on any mobile object such as an aircraft, a bicycle, or a motorcycle. In addition, the sensor apparatus may be implemented as a user device such as a smartphone or a head-mounted display (HMD).

In addition, each of the apparatuses described herein may be implemented as a single apparatus, or part or the whole thereof may be implemented different apparatuses. For example, in the functional component example of the onboard sensor apparatus 100 illustrated in FIG. 2, the storage section 160 and the control section 170 may be included in an apparatus such as a server connected to the detection section 110, the acquisition section 120, the first notification section 130, the second notification section 140, and the driving control section 150 via a network or the like. The same applies to the environment installation sensor apparatus 200.

In addition, the processing described herein with reference to the flowcharts and the sequence diagrams does not necessarily have to be executed in the illustrated order. Some processing steps may be executed in parallel. In addition, additional processing steps may also be adopted, while some of the processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a detection section configured to detect first information regarding a mobile object;

an acquisition section configured to acquire second information regarding the mobile object, the second information being detected by an external apparatus; and a control section configured to control processing based on a comparison result of the first information and the second information detected for the same mobile object.

(2)

The information processing apparatus according to (1), in which the control section determines an abnormality of the detection section on a basis of the comparison result.

(3)

The information processing apparatus according to (2), in which in a case where an erroneous difference between the first information and second information satisfies a predetermined condition, the control section determines that the detection section is abnormal.

(4)

The information processing apparatus according to (2) or (3), in which the control section adjusts the detection section such that an erroneous difference between the first information and the second information decreases.

(5)

The information processing apparatus according to any one of (2) to (4), in which the control section causes a user to be notified of information showing the abnormality.

(6)

The information processing apparatus according to any one of (2) to (5), in which the control section causes another apparatus to be notified of information showing the abnormality.

(7)

The information processing apparatus according to any one of (2) to (6), in which instead of the first information detected by the detection section determined to be abnormal, the control section uses the corresponding second information.

(8)

The information processing apparatus according to any one of (2) to (7), in which the control section causes automated driving of a vehicle to stop, the vehicle corresponding to the information processing apparatus.

(9)

The information processing apparatus according to (8), in which the control section causes the vehicle to stop, the vehicle corresponding to the information processing apparatus.

(10)

The information processing apparatus according to (8), in which the control section switches the vehicle corresponding to the information processing apparatus from the automated driving to human driving.

(11)

The information processing apparatus according to any one of (8) to (10), in which the control section controls the vehicle corresponding to the information processing apparatus such that the vehicle stays longer in the external apparatus's detection area of the second information.

(12)

The information processing apparatus according to any one of (1) to (11), in which the acquisition section preferentially acquires second sensor information from the external apparatus that is in a vicinity of a vehicle corresponding to the information processing apparatus or is predicted to be in the vicinity of the vehicle in future.

(13)

The information processing apparatus according to any one of (1) to (12), in which the acquisition section preferentially acquires second information from the external apparatus capable of detecting information regarding the mobile object more accurately than the detection section.

(14)

The information processing apparatus according to any one of (1) to (11), in which the first information and the second information include at least one of a position, size, a type, speed, acceleration and moving direction of the mobile object, a predicted value thereof, detection accuracy, detection time, and a degree of reliability.

(15)

The information processing apparatus according to any one of (1) to (12), in which the external apparatus is provided to another vehicle that faces a vehicle corresponding to the information processing apparatus, another vehicle that travels side by side with the vehicle or another vehicle that is stopped, or an infrastructure.

(16)

An information processing method including:

detecting first information regarding a mobile object;

acquiring second information regarding the mobile object, the second information being detected by an external apparatus; and controlling, by a processor, processing based on a comparison result of the first information and the second information detected for the same mobile object.

(17)

A program for causing a computer to function as:

a detection section configured to detect first information regarding a mobile object;

an acquisition section configured to acquire second information regarding the mobile object, the second information being detected by an external apparatus; and a control section configured to control processing based on a comparison result of the first information and the second information detected for the same mobile object.

REFERENCE SIGNS LIST 1 system
10 mobile object
100 onboard sensor apparatus
110 detection section
120 acquisition section
130 first notification section
140 second notification section
150 driving control section
160 storage section
170 control section
20 infrastructure
200 environment installation sensor apparatus
210 detection section
220 acquisition section
230 first notification section
240 second notification section
250 storage section
260 control section
30 server

The invention claimed is:

1. An information processing apparatus, comprising:
processing circuitry configured to
acquire, from a sensor configured to detect first information regarding an object, the first information;
acquire, from each of a plurality of external apparatuses, positional information of the each of the plurality of external apparatuses;
identify, from among the plurality of external apparatuses, at least one external apparatus located within a predetermined distance from the information processing apparatus based on the acquired positional information;
acquire, from the identified external apparatus, second information regarding the object, the second information being detected by the identified external apparatus;
determine whether a first degree of reliability associated with the first information satisfies a first reliability threshold;
determine whether a second degree of reliability associated with the second information satisfies a second reliability threshold; and
determine, in response to determining that the first degree of reliability satisfies the first reliability threshold and the second degree of reliability satisfies the second reliability threshold, whether the sensor is abnormal based on a comparison result of the first information and the second information detected for the object.

2. The information processing apparatus according to claim 1, wherein
the sensor is mounted on a first vehicle, and
the at least one external apparatus is a second vehicle.

3. The information processing apparatus according to claim 1, wherein
the processing circuitry is configured to determines that the sensor is abnormal in a case where a difference between the first information and second information satisfies a predetermined condition.

4. The information processing apparatus according to claim 1, wherein
the processing circuitry is configured to adjust the sensor such that a difference between the first information and the second information decreases.

5. The information processing apparatus according to claim 1, wherein
the processing circuitry is configured to output a notification indicating that the sensor is abnormal in response to determining that the sensor is abnormal.

6. The information processing apparatus according to claim 1, wherein
in response to determining that the sensor is abnormal, instead of using the first information detected by the sensor determined to be abnormal, the processing circuitry uses the second information.

7. The information processing apparatus according to claim 1, wherein
the processing circuitry causes automated driving of a vehicle to stop, the vehicle corresponding to the information processing apparatus, in response to determining that the sensor is abnormal.

8. The information processing apparatus according to claim 7, wherein
the processing circuitry causes the vehicle to stop, the vehicle corresponding to the information processing apparatus, in response to determining that the sensor is abnormal.

9. The information processing apparatus according to claim 7, wherein
the processing circuitry switches the vehicle from the automated driving to human driving in response to determining that the sensor is abnormal.

10. The information processing apparatus according to claim 7, wherein
the processing circuitry controls the vehicle such that the vehicle stays longer in the identified external apparatus's detection area of the second information in response to determining that the sensor is abnormal.

11. The information processing apparatus according to claim 1, wherein
the processing circuitry is configured to preferentially acquire the second information from the external apparatus capable of detecting information regarding the object more accurately than the sensor.

12. The information processing apparatus according to claim 1 wherein
the first information and the second information include at least one of a position, size, a type, speed, acceleration and moving direction of the object, a predicted value thereof, detection accuracy, detection time, and a degree of reliability.

13. The information processing apparatus according to claim 1, wherein
the identified external apparatus is provided to another vehicle that faces a vehicle corresponding to the information processing apparatus, another vehicle that travels side by side with the vehicle or another vehicle that is stopped, or an infrastructure.

14. The information processing apparatus according to claim 1, wherein
the first information and the second information include size information of the object.

15. The information processing apparatus according to claim 1, wherein
the identified external apparatus is provided to an infrastructure.

16. An information processing method, comprising:
acquiring, from a sensor configured to detect first information regarding an object, the first information;

acquiring, from each of a plurality of external apparatuses, positional information of the each of the plurality of external apparatuses;

identifying, from among the plurality of external apparatuses, at least one external apparatus located within a predetermined distance from the information processing apparatus based on the acquired positional information;

acquiring, from the identified external apparatus, second information regarding the object, the second information being detected by the identified external apparatus;

determining, using processing circuitry, whether a first degree of reliability associated with the first information satisfies a first reliability threshold;

determining, using the processing circuitry, whether a second degree of reliability associated with the second information satisfies a second reliability threshold; and determining, using the processing circuitry, in response to determining that the first degree of reliability satisfies the first reliability threshold and the second degree of reliability satisfies the second reliability threshold, whether the sensor is abnormal based on a comparison result of the first information and the second information detected for the object.

17. A non-transitory computer readable medium including executable instructions, which when executed by a computer cause the computer to execute an information processing method, the method comprising:

acquiring, from a sensor configured to detect first information regarding an object, the first information;

acquiring, from each of a plurality of external apparatuses, positional information of the each of the plurality of external apparatuses;

identifying, from among the plurality of external apparatuses, at least one external apparatus located within a predetermined distance from the information processing apparatus based on the acquired positional information;

acquiring, from the identified external apparatus, second information regarding the object, the second information being detected by the identified external apparatus;

determining whether a first degree of reliability associated with the first information satisfies a first reliability threshold;

determining whether a second degree of reliability associated with the second information satisfies a second reliability threshold; and determining, in response to determining that the first degree of reliability satisfies the first reliability threshold and the second degree of reliability satisfies the second reliability threshold, whether the sensor is abnormal based on a comparison result of the first information and the second information detected for the object.

* * * * *